US012283737B2

(12) United States Patent
Wang et al.

(10) Patent No.: US 12,283,737 B2
(45) Date of Patent: Apr. 22, 2025

(54) ELECTROMAGNETIC WAVE GUIDANCE AND BEAM RESHAPING STRUCTURE

(71) Applicant: INDUSTRIAL TECHNOLOGY RESEARCH INSTITUTE, Hsinchu (TW)

(72) Inventors: Joseph Poujiong Wang, New Taipei (TW); Wei-Yu Li, Yilan (TW); Wei Chung, Hsinchu County (TW); Chun-An Lu, Taipei (TW); Jiun-Jang Yu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 274 days.

(21) Appl. No.: 18/089,241

(22) Filed: Dec. 27, 2022

(65) Prior Publication Data

US 2024/0213646 A1 Jun. 27, 2024

(51) Int. Cl.
*H01P 3/123* (2006.01)
*H01Q 15/04* (2006.01)

(52) U.S. Cl.
CPC ............. *H01P 3/123* (2013.01); *H01Q 15/04* (2013.01)

(58) Field of Classification Search
CPC ...... H01Q 21/061; H01Q 3/44; H01Q 9/0407; H01Q 1/38; H01Q 1/405; H01Q 13/0208; H01Q 13/0283; H01Q 13/206; H01Q 13/24; H01Q 15/0086; H01Q 15/0093; H01Q 15/02; H01Q 19/30; H01Q 21/0006;

(Continued)

(56) References Cited

U.S. PATENT DOCUMENTS

| | | | |
|---|---|---|---|
| 7,646,326 | B2 | 1/2010 | Antonik |
| 7,884,778 | B2 | 2/2011 | Wu |

(Continued)

FOREIGN PATENT DOCUMENTS

| | | |
|---|---|---|
| CN | 102760954 | 10/2012 |
| CN | 105576368 | 5/2016 |

(Continued)

OTHER PUBLICATIONS

"2-D Luneburg Lens Beamforming Network for Planar Phased Array of Antennas to Radiate Near-Field Focused Multibeams" Chang et al., Aug. 2020.

(Continued)

*Primary Examiner* — Lincoln D Donovan
*Assistant Examiner* — Tyler J Pereny
(74) *Attorney, Agent, or Firm* — Maschoff Brennan

(57) ABSTRACT

An electromagnetic wave guidance and beam reshaping structure is favorable to incorporate a radiation source antenna into an energy focusing system. The electromagnetic wave guidance and beam reshaping structure includes a substrate, a plurality of metal patterns and a plurality of hollow structures. The substrate includes a central portion and a peripheral portion that surrounds the central portion. The plurality of metal patterns are disposed on the central portion. The plurality of hollow structures are disposed in the peripheral portion. The metal patterns are axisymmetrically arranged with respect to a central axis of the substrate, and the hollow structures are axisymmetrically arranged with respect to the central axis of the substrate.

18 Claims, 40 Drawing Sheets

(58) Field of Classification Search
CPC .. H01Q 21/0093; H01Q 21/08; H01Q 25/005; H01Q 9/285; G01S 13/89; G01S 13/26; G01S 13/282; G01S 13/34; H01P 3/121; H01P 3/16; H01P 5/107; H01P 3/06; H01P 3/12; H01P 3/123; H01P 5/12; H01P 5/19
See application file for complete search history.

(56) References Cited

U.S. PATENT DOCUMENTS

| | | | | |
|---|---|---|---|---|
| 8,193,974 | B2 | 6/2012 | Logan | |
| 8,421,696 | B2 * | 4/2013 | Lin | H01Q 1/422 343/756 |
| 8,466,829 | B1 | 6/2013 | Volman | |
| 8,948,718 | B2 | 2/2015 | Woodsum | |
| 9,070,972 | B2 | 6/2015 | Wang | |
| 9,154,353 | B2 | 10/2015 | Woodsum | |
| 9,459,346 | B2 | 10/2016 | Einziger | |
| 9,590,315 | B2 | 3/2017 | Evtyushkin | |
| 9,609,692 | B2 | 3/2017 | Bilchinsky | |
| 9,972,901 | B2 | 5/2018 | Lavin | |
| 10,079,633 | B2 | 9/2018 | Elwell | |
| 10,247,815 | B1 | 4/2019 | Koubiadis | |
| 10,545,232 | B2 | 1/2020 | Liu | |
| 11,163,116 | B2 | 11/2021 | Lopez | |
| 11,385,384 | B2 | 7/2022 | Diehl | |
| 2004/0008145 | A1 * | 1/2004 | Killen | H01Q 15/02 343/753 |
| 2005/0140556 | A1 * | 6/2005 | Ohno | H01Q 21/08 343/770 |

FOREIGN PATENT DOCUMENTS

| | | |
|---|---|---|
| CN | 109728446 | 5/2019 |
| CN | 110495049 | 11/2019 |
| TW | 200623521 | 7/2006 |
| TW | 201539862 | 10/2015 |

OTHER PUBLICATIONS

"A Cylindrical Lens Antenna With Extremely Flat Beams" Zhang et al. Sep. 2019.
"A Cylindrical Luneberg Lens Antenna with Extremely Wide Fan-Beam" Zhang et al. 2018.
"A high gain Fabry-Perot cavity antenna with a double-layered partially reflecting frequency selective surface structure" Yao et al. 2017.
"A novel hole drilling method for plate Luneberg lens antenna" Yao et al. 2014.
"A single layer high gain Fabry-Perot cavity antenna" Nguyen et al. 2015.
"Circular polarization flat-layered spherical Luneberg Lens antenna system" Ryazantsev R.O., 2014.
"Design and Performance Evaluation of a Dielectric Flat Lens Antenna for Millimeter-Wave Applications" Imbert et al. 2015.
"Design of dual-polarized high-gain antenna radome by using Jerusalem cross metamaterial structure" Huang et al., 2009.
"Fan-Beam Millimeter-Wave Antenna Design Based on the Cylindrical Luneberg Len" Wu et al. 2007.
Improvement of the Scanning Performance of the Extended Hemispherical Integrated Lens Antenna Using a Double Lens Focusing System Nguyen et al. 2016.
"Investigation Into the Effects of the Patch-Type FSS Superstrate on the High-Gain Cavity Resonance Antenna Design" Foroozesh et al. 2010.
"Millimeter-Wave Electronically Steerable Integrated Lens Antennas for Wlan Wpan Applications" Artemenko et al. 2013.
"The design of layered luneberg lens with radially-drilled-hole-structure" He et al. Dec. 2022.
"Very Broadband Extended Hemispherical Lenses Role of Matching Layers for Bandwidth Enlargement" Nguyen et al. 2009.
"Gradient-index optics" Wikipedia, Jun. 2022.

* cited by examiner

ELECTROMAGNETIC WAVE GUIDANCE AND BEAM RESHAPING STRUCTURE

TECHNICAL FIELD

The present disclosure relates to an electromagnetic wave guidance and beam reshaping structure, more particularly to an electromagnetic wave guidance and beam reshaping structure applicable to an antenna.

BACKGROUND

With the development of mobile communication technology, the high frequency bands greater than 100 GHz (e.g., such as sub-THz) are widely used for supporting high-speed and high-capacity communication. The bands of 140 GHz to 170 GHz and 220 GHz to 330 GHz are preferably used for the next generation of mobile communication since the path loss is relatively low. It is known that the higher the propagation frequency, the higher the path loss would be generated. For example, an increase in frequency from 38 GHz to 150 GHz may lead to a path loss of about 12 dB.

An option for dealing with the problem is to increase the number of antenna elements of the antenna array. By doing so, the output power of active components may increase and therefore can improve the antenna gain, but it requires a significant increase in the number of antenna elements, so as to be potentially able to compensate for the path loss. Thus, the complexity of the radio-frequency front-end modules integrated with the antenna array and the overall power consumption have to be increased, which leads to an increase in loss of packaging and hence limits realized gain improvement.

Instead of enhancing the output power of active components, some alternative solutions have been proposed, for example, an antenna can be combined with a resonant cavity, a curved lens or a gradient-index lens (GRIN lens), so as to improve the antenna gain or the antenna directivity. However, due to the resonance characteristics, the high-gain frequency band that the resonant cavity can provide is extremely narrow and therefore is not favorable for wide applications; effective resonance is also sensitive to the size of the resonant cavity, so the manufacturing accuracy of the resonant cavity is quite demanding. Moreover, the curved lens requires curvature formulation to focus electromagnetic waves, but the curved lens is not easy to be integrated into small antenna-containing products such as mobile phones. Furthermore, due to the properties of the selected materials of the GRIN lens, it is not easy to perform additional manufacturing processes on the GRIN lens, such as the drilling process, so that the flexibility in GRIN lens design is constrained.

Accordingly, the relevant fields are constantly working on the solution that can be easily and flexibly manufactured and can be used in a wide range of frequency as well as achieving the required gain and directivity of electromagnetic waves.

SUMMARY

The present disclosure provides an electromagnetic wave guidance and beam reshaping structure that is easily manufactured and integrated into an antenna-containing product and has high design flexibility so as to be widely used in various bands.

According to one embodiment of the present disclosure, an electromagnetic wave guidance and beam reshaping structure configured to be disposed on an antenna is favorable to incorporate a radiation source antenna into an energy focusing system. The electromagnetic wave guidance and beam reshaping structure includes a substrate, a plurality of metal patterns and a plurality of hollow structures. The substrate includes a central portion and a peripheral portion that surrounds the central portion. The plurality of metal patterns are disposed on the central portion. The plurality of hollow structures are disposed in the peripheral portion. The plurality of metal patterns are axisymmetrically arranged with respect to a central axis of the substrate, and the plurality of hollow structures are axisymmetrically arranged with respect to the central axis of the substrate.

According to another embodiment of the present disclosure, an electromagnetic wave guidance and beam reshaping structure configured to be disposed on an antenna is favorable to incorporate a radiation source antenna into an energy focusing system. The electromagnetic wave guidance and beam reshaping structure includes a plurality of substrates stacked with each other, a plurality of metal patterns and a plurality of hollow structures. Each of the plurality of substrates includes a central portion and a peripheral portion that surrounds the central portion. The plurality of metal patterns are disposed on the central portion of at least one of the plurality of substrates. The plurality of hollow structures are disposed in the peripheral portion of at least one of the plurality of substrates. The plurality of metal patterns are axisymmetrically arranged with respect to a central axis of the substrate, and the plurality of hollow structures are axisymmetrically arranged with respect to the central axis of the substrate.

According to the electromagnetic wave guidance and beam reshaping structure discussed above, by arranging the metal patterns and the hollow structures on the substrate, the electromagnetic wave guidance and beam reshaping structure can have respective equivalent dielectric constant distributions at the central portion and the peripheral portion. This is favorable for adjusting the reflectivity of the electromagnetic waves so that the electromagnetic waves will have a focusing effect. Moreover, the electromagnetic wave guidance and beam reshaping structure may be a flat structure and therefore is capable of integration into various products. Furthermore, the electromagnetic wave guidance and beam reshaping structure is relatively easy to be manufactured. Furthermore, the design of the equivalent dielectric constant distribution of the electromagnetic wave guidance and beam reshaping structure is flexible since the configurations of the metal patterns and the hollow structures is easily modified as required. This allows the electromagnetic wave guidance and beam reshaping structure to be applied to various frequency ranges.

BRIEF DESCRIPTION OF THE DRAWINGS

The present disclosure will become further understood from the detailed description given hereinbelow and the accompanying drawings which are given by way of illustration only and thus are not intending to limit the present disclosure and wherein.

DETAILED DESCRIPTION

Aspects and advantages of the invention will become apparent from the following detailed descriptions with the accompanying drawings. For purposes of explanation, one or more specific embodiments are given to provide a thorough understanding of the invention, and which are described in sufficient detail to enable one skilled in the art to practice the described embodiments. It should be understood that the following descriptions are not intended to limit the embodiments to one specific embodiment. On the contrary, it is intended to cover alternatives, modifications, and equivalents as can be included within the spirit and scope of the described embodiments as defined by the appended claims.

Figure 1:
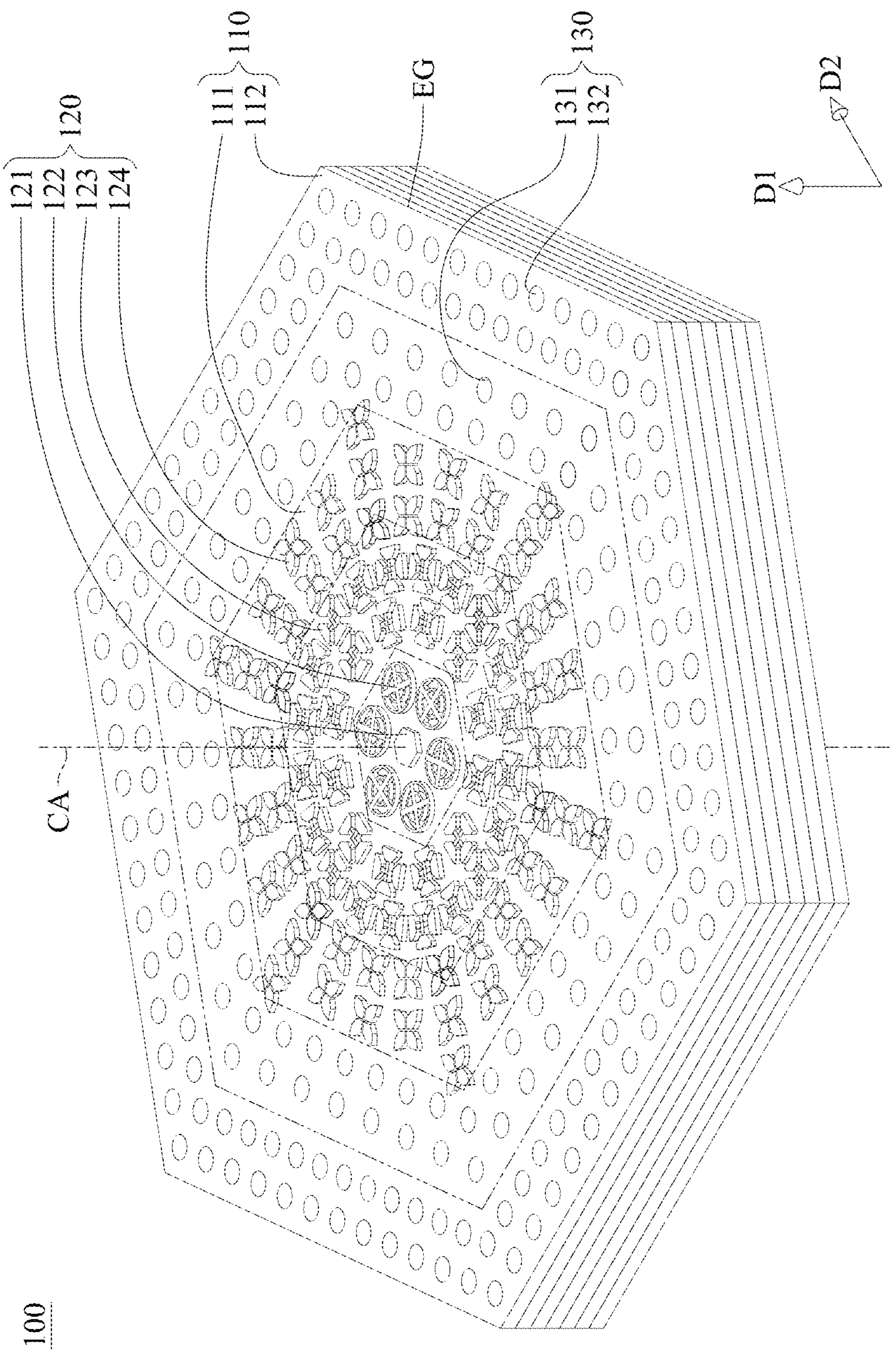
FIG. 1 is a perspective view of an electromagnetic wave guidance and beam reshaping structure according to one embodiment of the present disclosure.
Figure 2:
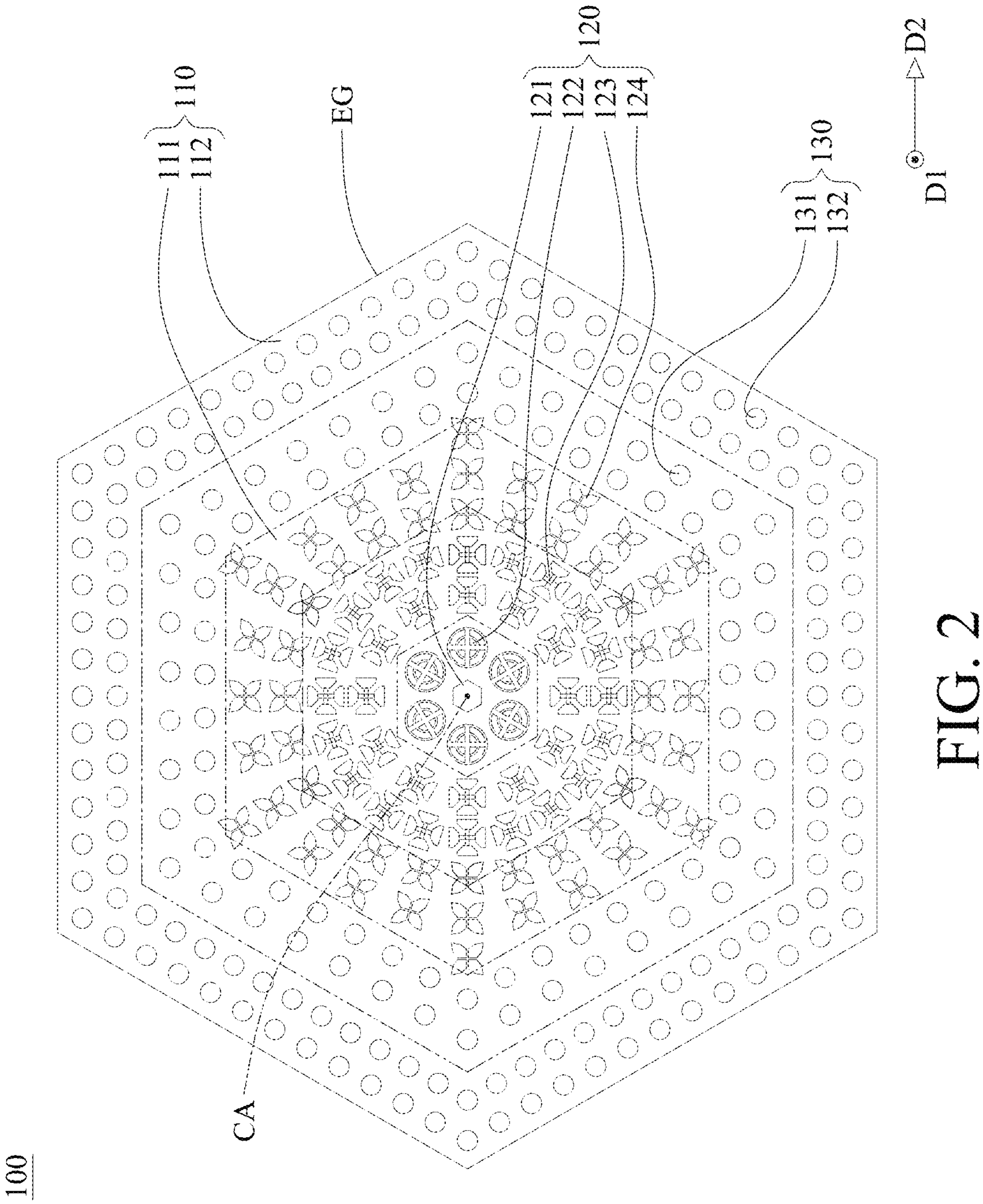
FIG. 2 is a top view of the electromagnetic wave guidance and beam reshaping structure in FIG. 1.
Figure 3:
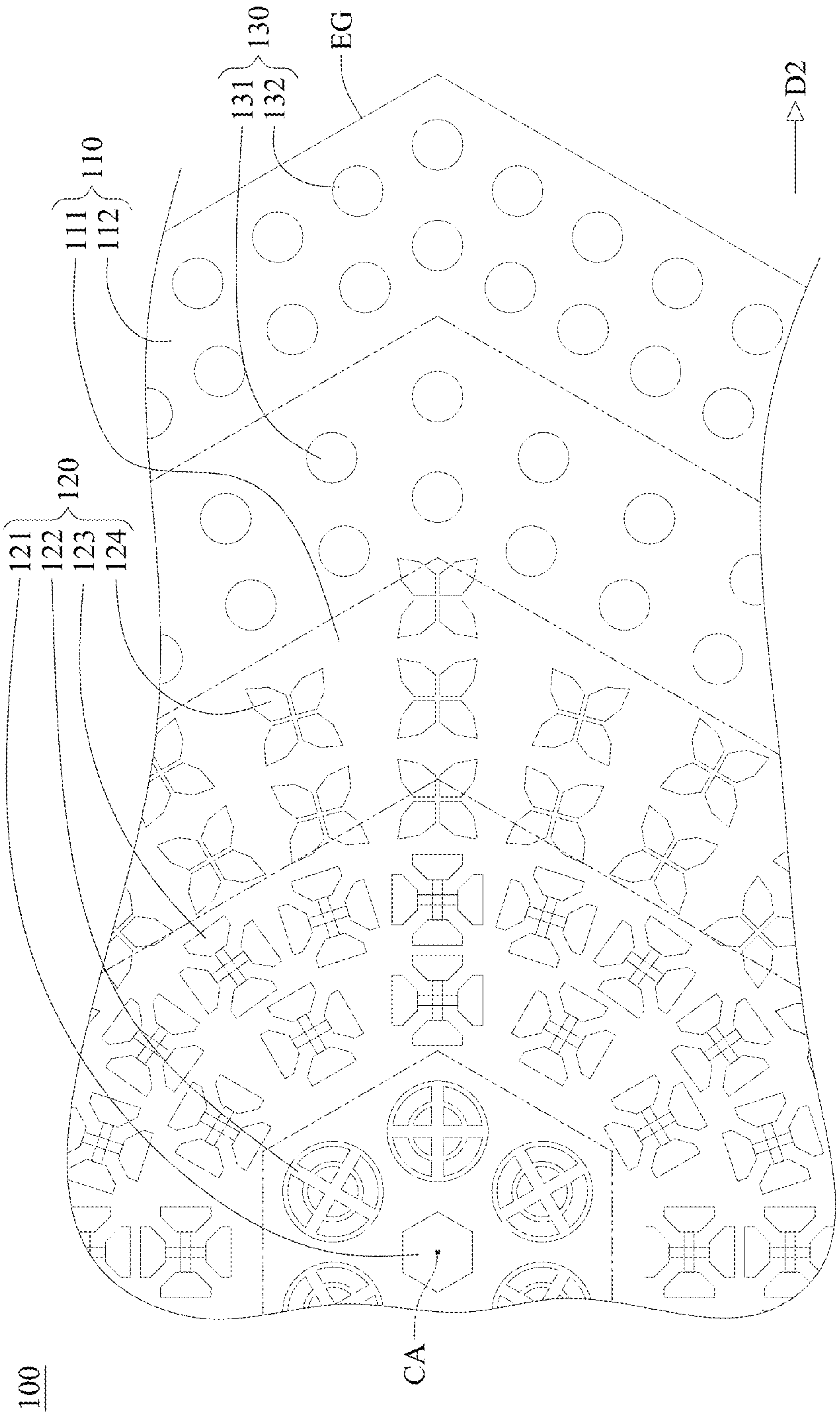
FIG. 3 is a partial and enlarged view of the electromagnetic wave guidance and beam reshaping structure in FIG. 2.
Figure 4:
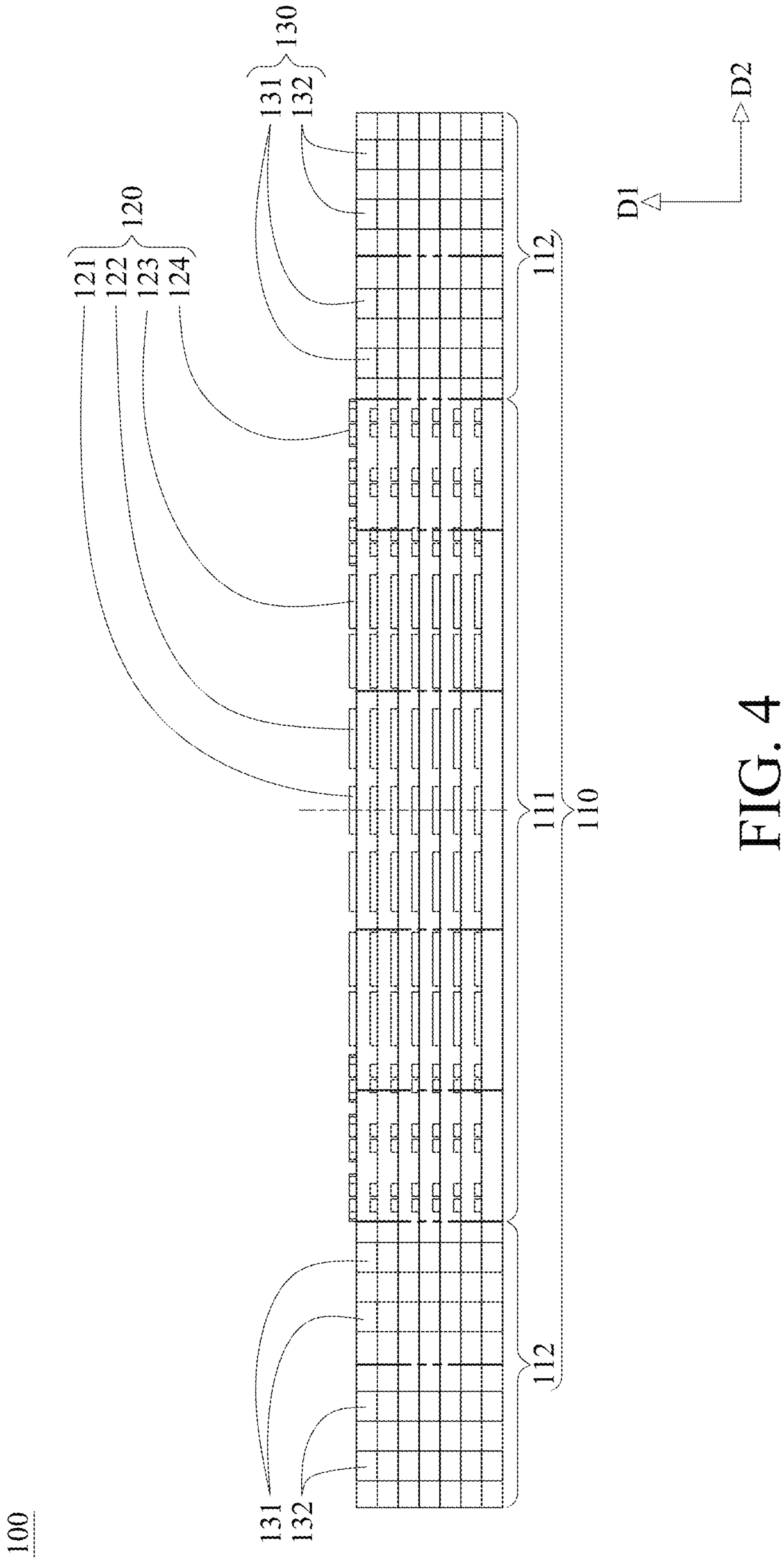
FIG. 4 is a cross-sectional view of the electromagnetic wave guidance and beam reshaping structure in FIG. 1.

Please refer to FIG. 1 to FIG. 4, where FIG. 1 is a perspective view of an electromagnetic wave guidance and beam reshaping structure 100 according to one embodiment of the present disclosure, FIG. 2 is a top view of the electromagnetic wave guidance and beam reshaping structure 100 in FIG. 1, FIG. 3 is a partial and enlarged view of the electromagnetic wave guidance and beam reshaping structure 100 in FIG. 2, and FIG. 4 is a cross-sectional view of the electromagnetic wave guidance and beam reshaping structure 100 in FIG. 1.

The electromagnetic wave guidance and beam reshaping structure 100 provided in one embodiment of the present disclosure is configured to be disposed on an antenna (not shown) to allow electromagnetic waves emitted from or received by the antenna to be focused, thereby improving the gain and the directivity of the focused electromagnetic waves. As such, the electromagnetic wave guidance and beam reshaping structure 10 provided in one embodiment of the present disclosure is able to provide good guidance for electromagnetic wave and effectively reshape the wave distribution in the beamspace. Further, the electromagnetic wave guidance and beam reshaping structure 100 provided in one embodiment of the present disclosure is suitable for integrating an antenna radiation source into an energy focusing system. The electromagnetic wave guidance and beam reshaping structure 100 includes a plurality of substrates 110, a plurality of metal patterns 120, and a plurality of hollow structures 130.

The substrates 110 are stacked with each other along a first direction D1. Each substrate 110 may be a plate including a suitable homogeneous material, where the homogeneous material is uniformly distributed in the substrate 110 so that dielectric constant (Dk) is uniform throughout the substrate 110. Each substrate 110 includes a central portion 111 and a peripheral portion 112 surrounding the central portion 111. In this embodiment, the substrates 110 are the same in configuration and therefore only one of the substrates 110 will be described in detail hereinafter.

The metal patterns 120 are disposed on the central portion 111 and are axisymmetrically arranged with respect to a central axis CA (extend along a normal direction of the substrate 110, where the normal direction is denoted by D1 and may be called "first direction D1" hereinafter) at the innermost of the substrate 110. The central axis CA may extend along the normal direction of the substrate 110. The metal patterns 120 are substantially the same in thickness. The metal patterns 120 include a plurality of first metal patterns 121, a plurality of second metal patterns 122, a plurality of third metal patterns 123, and a plurality of fourth metal patterns 124. Herein, the direction perpendicular to the central axis CA and pointing from the central axis CA to an edge EG of the substrate 110 is denoted by D2 and may be called "second direction D2" hereinafter. The first metal patterns 121, the second metal patterns 122, the third metal patterns 123, and the fourth metal patterns 124 are disposed on the central portion 111 and sequentially arranged in the second direction D2. Also, the surface areas of the first metal patterns 121, the second metal patterns 122, the third metal patterns 123, and the fourth metal patterns 124 gradually reduce in the second direction D2. In other words, the surface area proportions of the metal patterns 120 gradually reduce in the second direction D2. Thus, the ratios of the metal patterns 120 to the unit surface areas of the substrate 110 gradually decrease in the second direction D2. The "unit surface area" used herein means each of a plurality of smaller areas on average divided from the surface of the substrate 110. In the central portion 111, every unit surface area has a metal pattern 120 thereon. Thus, it is possible to calculate the ratio of one metal pattern 120 to the unit surface area of the substrate 110. Note that the unit surface areas are not actually depicted in the drawings and the size of the unit surface areas may be determined according to actual requirements.

Regarding electromagnetic wave propagation, the equivalent dielectric constant of the combination of the central portion 111 and the metal patterns 120 is higher than the dielectric constant of the central portion 111 itself of the homogenous material. Also, among the unit surface areas in the central portion 111, the equivalent dielectric constant varies in the second direction D2 since the proportions of the metal patterns 120 gradually reduce in the second direction D2. Specifically, the greater the ratio of the metal pattern 120 to the unit surface area, the higher the equivalent dielectric constant is obtained. That is, it is possible to realize an equivalent dielectric constant distribution which increases towards the central axis CA simply by decreasing the surface areas of the metal pattern 120 but without changing the properties of central portion 111. In other words, the equivalent dielectric constant of the electromagnetic wave guidance and beam reshaping structure 100 at the central portion 111 can be higher than that of the original substrate 110 itself by arranging the first metal patterns 121 to the fourth metal patterns 124, that are substantially the same in thickness and have the surface areas gradually reduced along the direction from the central axis CA at the innermost of the substrate 110 to the edge EG at the outermost of the substrate 110, on the central portion 111, rather than changing the material distribution uniformity or the constitution of materials in the central portion 111. Also, the closer to the central axis CA, the higher the equivalent dielectric constant thereof is.

The hollow structures 130 are disposed in the peripheral portion 112 and are axisymmetrically arranged with respect to the central axis CA at the innermost of the substrate 110. The hollow structures 130 may be through holes formed on the substrate 110. The hollow structures 130 include a plurality of first hollow structures 131 and a plurality of second hollow structures 132. The first hollow structures 131 are located closer to the central portion 111 than the second hollow structures 132; in other words, the first hollow structures 131 are located between the central portion 111 and the second hollow structures 132. In this embodiment, the first hollow structures 131 and the second hollow structures 132 may have the same cross-sectional area. Also, the distance between the adjacent first hollow structures 131 (the interval between two of the first hollow structures 131 located adjacent to each other) is greater than the distance between the adjacent second hollow structures 132 (the intervals between two of the second hollow structures 132 located adjacent to each other), such that the volume proportions of the hollow structures 130 increase in the second direction D2. In other words, the ratios of the hollow structures 130 to the unit volumes of the substrate 110 gradually increase in the second direction D2. The "unit volume" used herein means each of a plurality of smaller portions on average divided from the substrate 110. In the peripheral portion 112, every unit volume has a hollow structure 130 therein. Thus, it is possible to calculate the ratio of one hollow structure 130 to the unit volume of the substrate 110. Note that the unit volumes are not actually depicted in the drawings and the size of the unit volumes may be determined according to actual requirements.

The hollow structures 130, as through holes, are able to accommodate air. It is known that air has a relatively low dielectric constant and therefore the hollow structures 130 can realize a plurality of areas with lower dielectric constant in the peripheral portion 112. Regarding the propagation of electromagnetic waves, the equivalent dielectric constant of the combination of the peripheral portion 112 and the hollow structures 130 is lower than the dielectric constant of the peripheral portion 112 itself of the homogenous material. Also, since the intervals among the first hollow structures 131 are larger than the intervals among the second hollow structures 132, the ratio of the second hollow structures 132 to the unit volumes of the substrate 110 is higher than the ratio of the first hollow structures 131 to the unit volumes of the substrate 110. As such, it is possible to realize an equivalent dielectric constant distribution which decreases towards the edge EG simply by arranging the density of the hollow structures 130 in the peripheral portion 112 but without changing the properties of the substrate 110. In other words, the equivalent dielectric constant of the electromagnetic wave guidance and beam reshaping structure 100 at the peripheral portion 112 can be lower than that of the original substrate 110 itself by arranging the first hollow structures 131 to the second hollow structures 132, that are substantially the same in cross-sectional area and have the intervals gradually reduced along the direction from the central axis CA at the innermost of the substrate 110 to the edge EG at the outermost of the substrate 110, in the peripheral portion 112, rather than changing the material distribution uniformity or the constitution of materials in the peripheral portion 112. Also, the closer to the edge EG, the lower the equivalent dielectric constant thereof is.

With the aforementioned arrangements of the metal patterns 120 and the hollow structures 130 on the substrate 110, the equivalent dielectric constant of the electromagnetic wave guidance and beam reshaping structure 100 gradually reduces from the central axis CA to the edge EG (i.e., in the second direction D2). This is favorable for adjusting the reflectivity of the electromagnetic waves so that the electromagnetic waves will have a focusing effect similar to a curved lens. In an example that the homogeneous material of the substrate 110 has a dielectric constant of 7, the areas in the electromagnetic wave guidance and beam reshaping structure 100 which respectively correspond to the first metal patterns 121, the second metal patterns 122, the third metal patterns 123, the fourth metal patterns 124, the first hollow structures 131, and the second hollow structures 132 may respectively have equivalent dielectric constants of 11, 9, 8, 7, 5, and 3 that are gradually reduced from the central axis CA to the edge EG, thereby capable of making the electromagnetic waves focused. Moreover, as shown, the electromagnetic wave guidance and beam reshaping structure 100 may be a flat structure and therefore is more applicable to various products than the conventional curved lens. Furthermore, compared to the resonant cavity, the curved lens, the gradient-index lens, or the heterogeneous structure with non-uniform dielectric constant, the electromagnetic wave guidance and beam reshaping structure 100 is relatively easy to be manufactured. Furthermore, the design of the equivalent dielectric constant distribution of the electromagnetic wave guidance and beam reshaping structure 100 is flexible since the configurations of the metal patterns 120 and the hollow structures 130 is easily modified as required. This allows the electromagnetic wave guidance and beam reshaping structure 100 to be applied to various frequency ranges.

Figure 5:
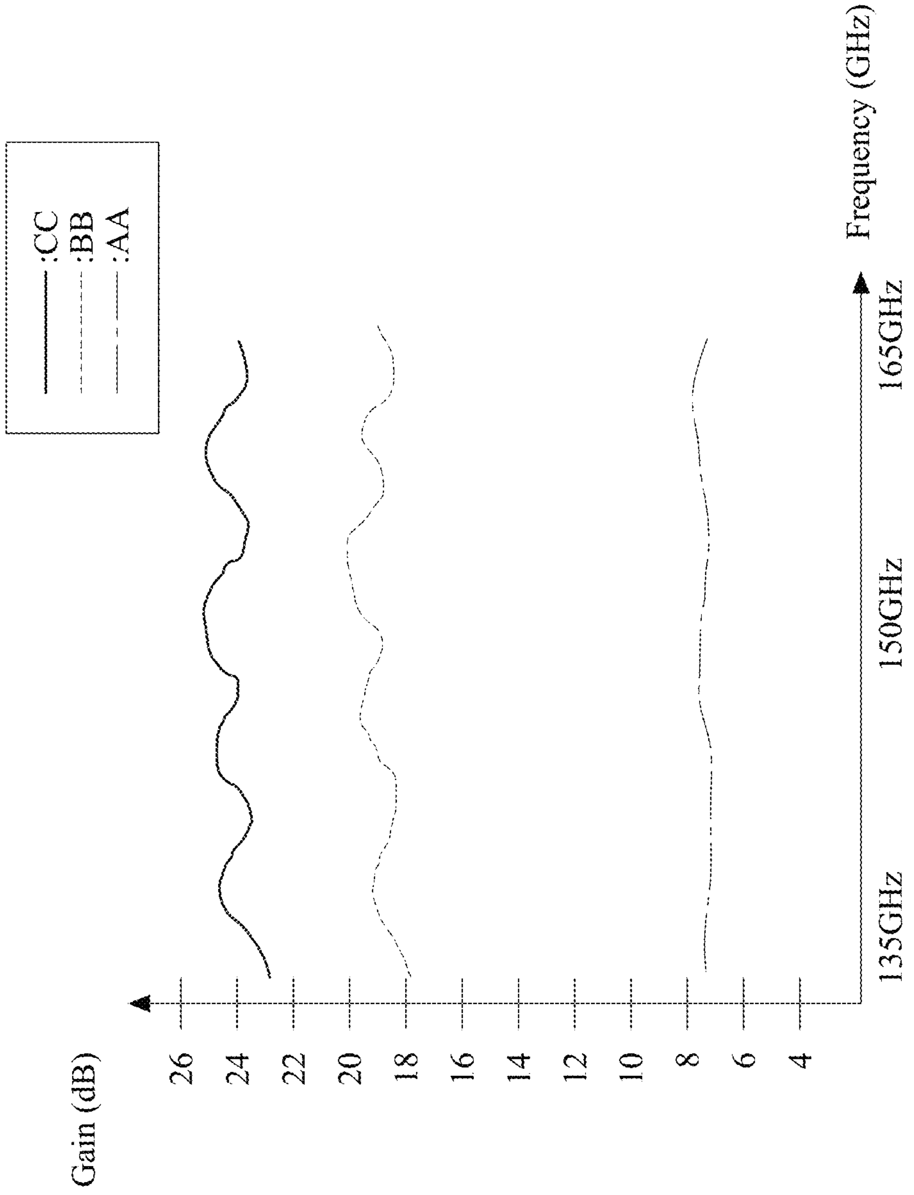
FIG. 5 is a gain effect chart when the electromagnetic wave guidance and beam reshaping structure in FIG. 1 is applied to an antenna.
Figure 6A:
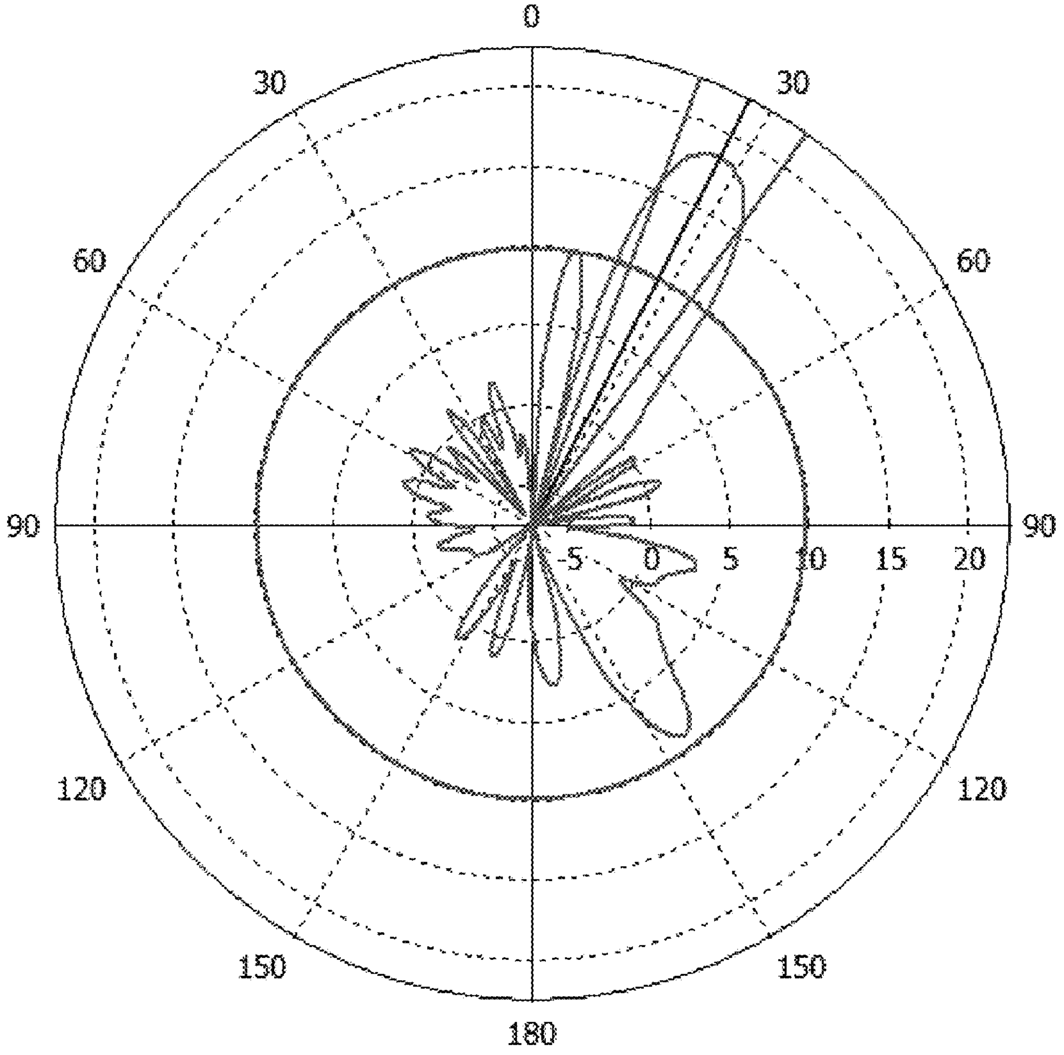
FIG. 6*a* to FIG. 6*f* are simulation diagrams showing the beam focusing and directing effect when the electromagnetic wave guidance and beam reshaping structure in FIG. 1 is applied to an antenna and has an offset angle of 0 degrees.
Figure 6B:
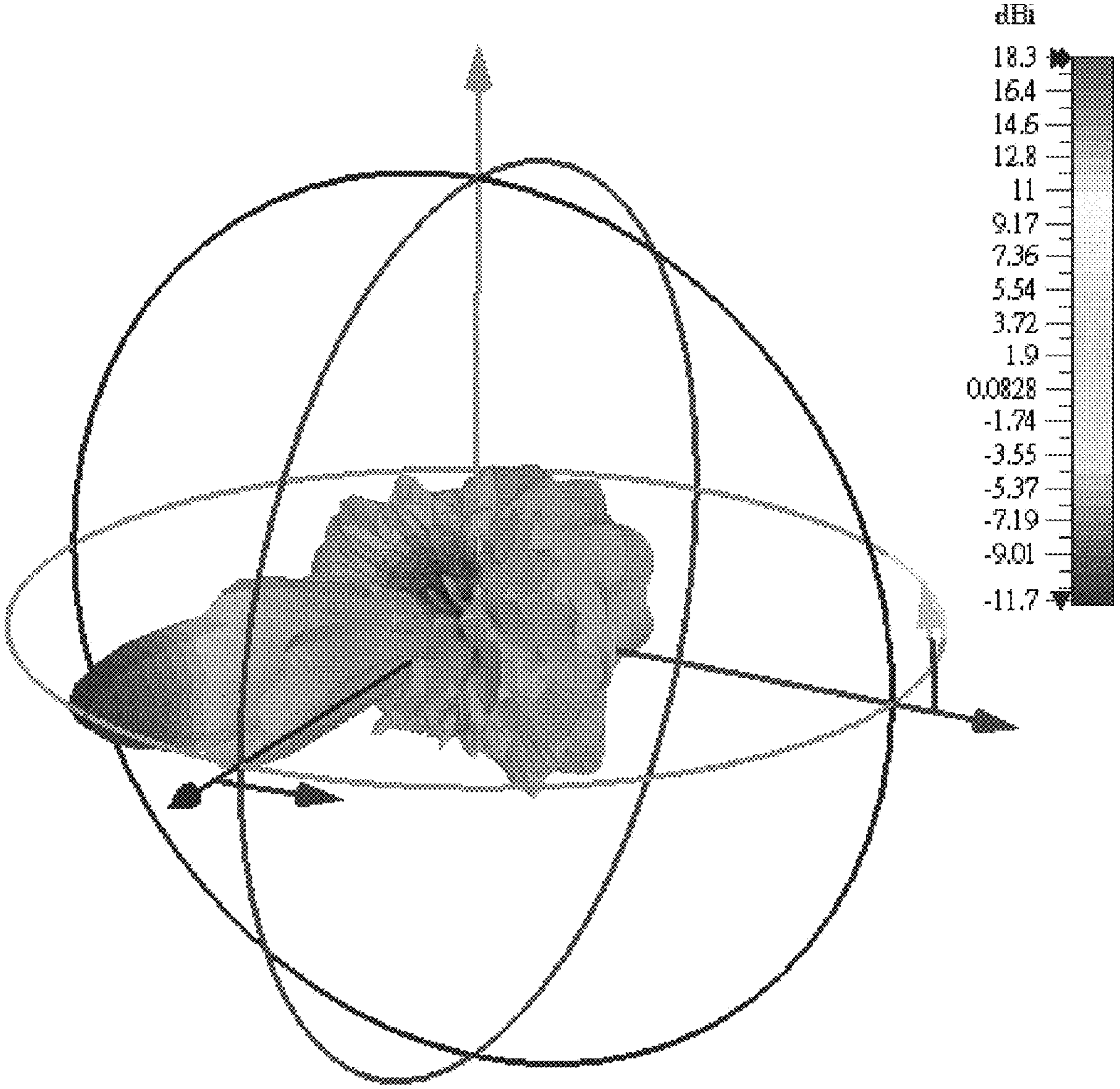
Figure 6C:
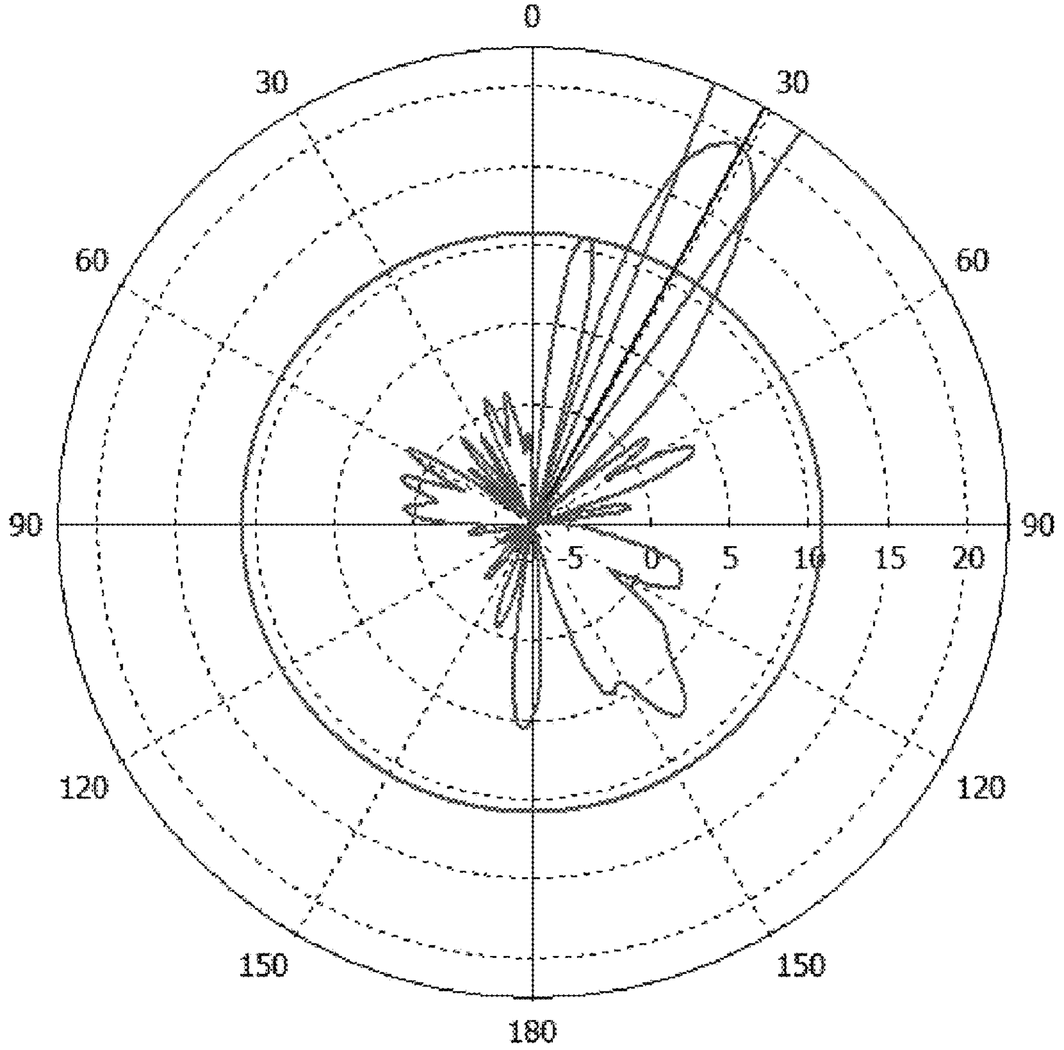
Figure 6D:
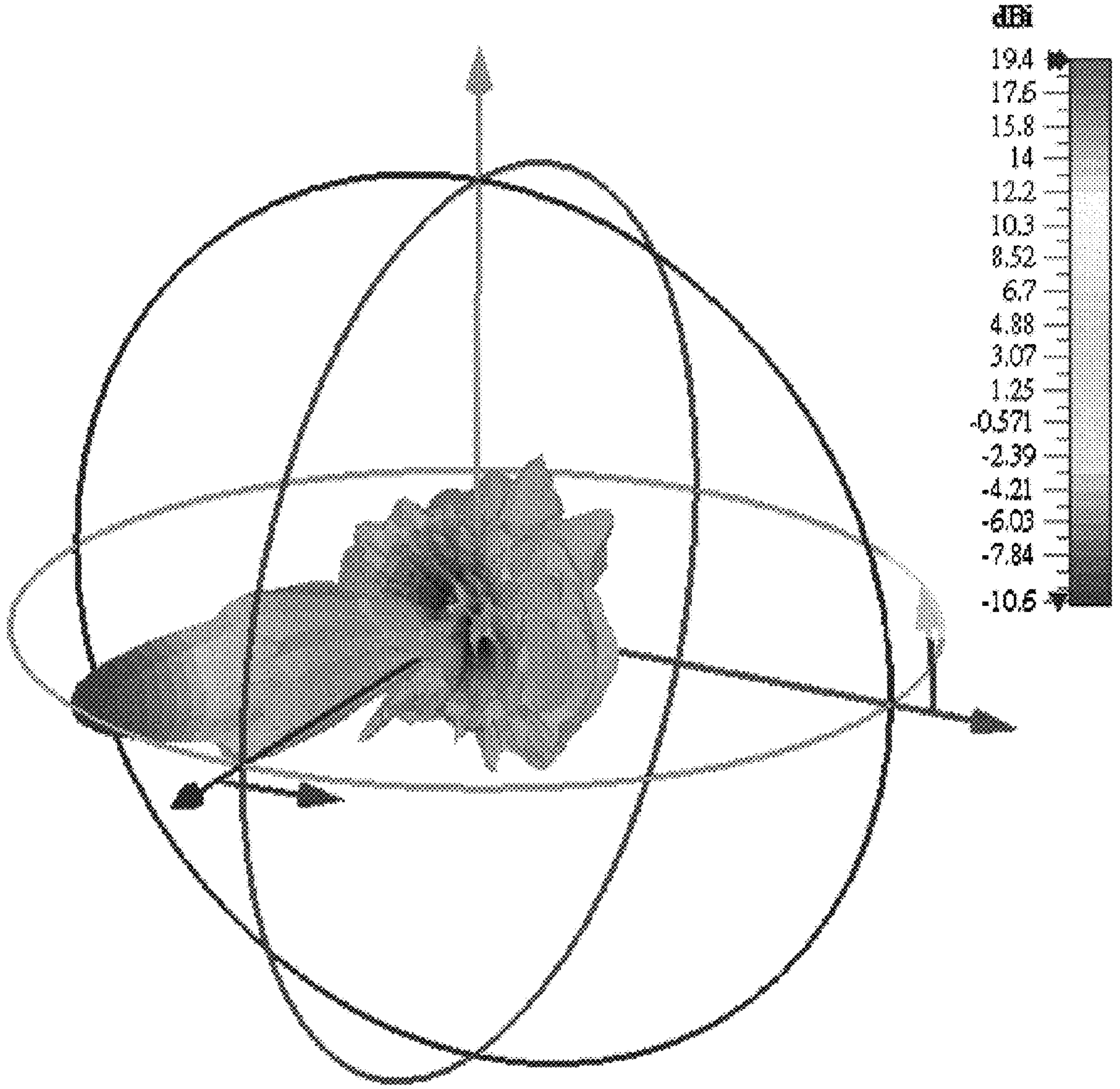
Figure 6E:
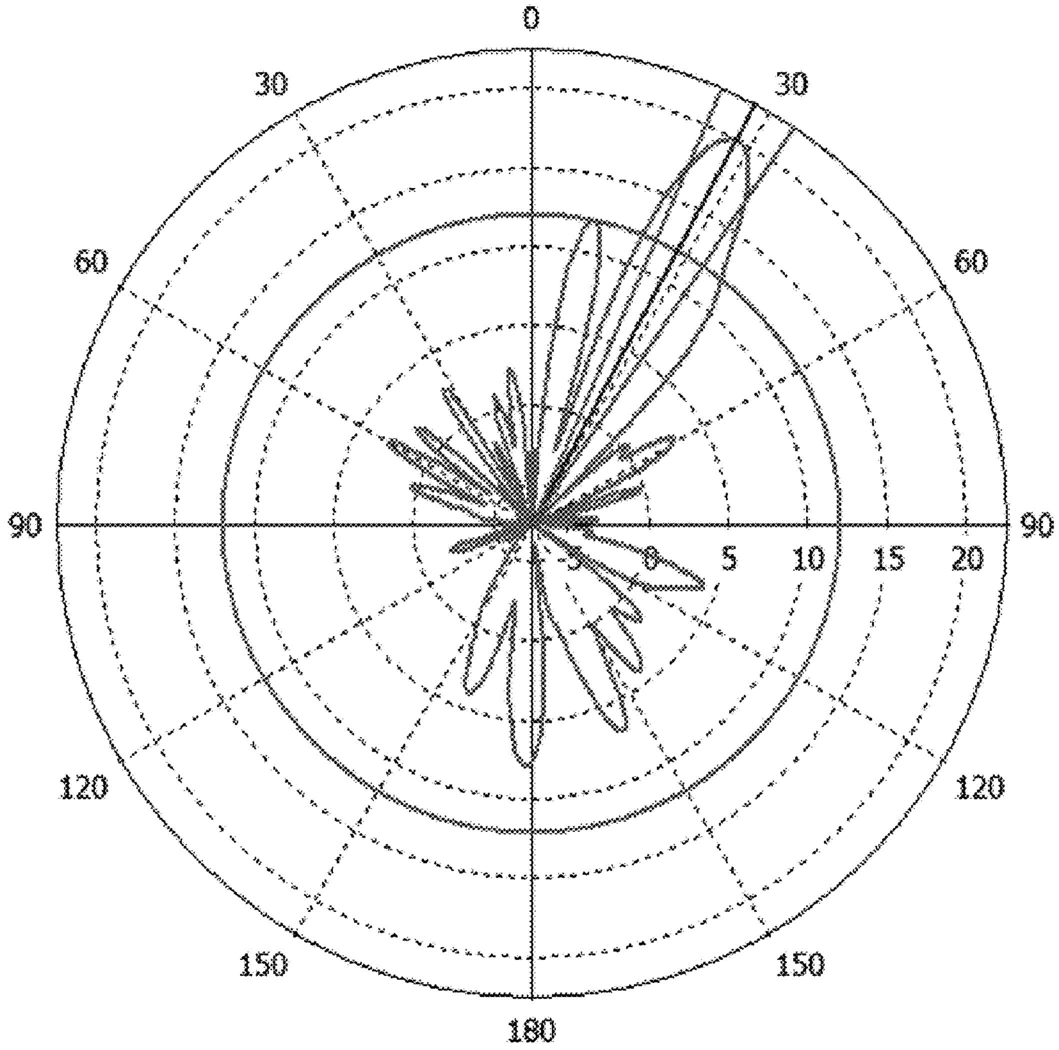
Figure 6F:
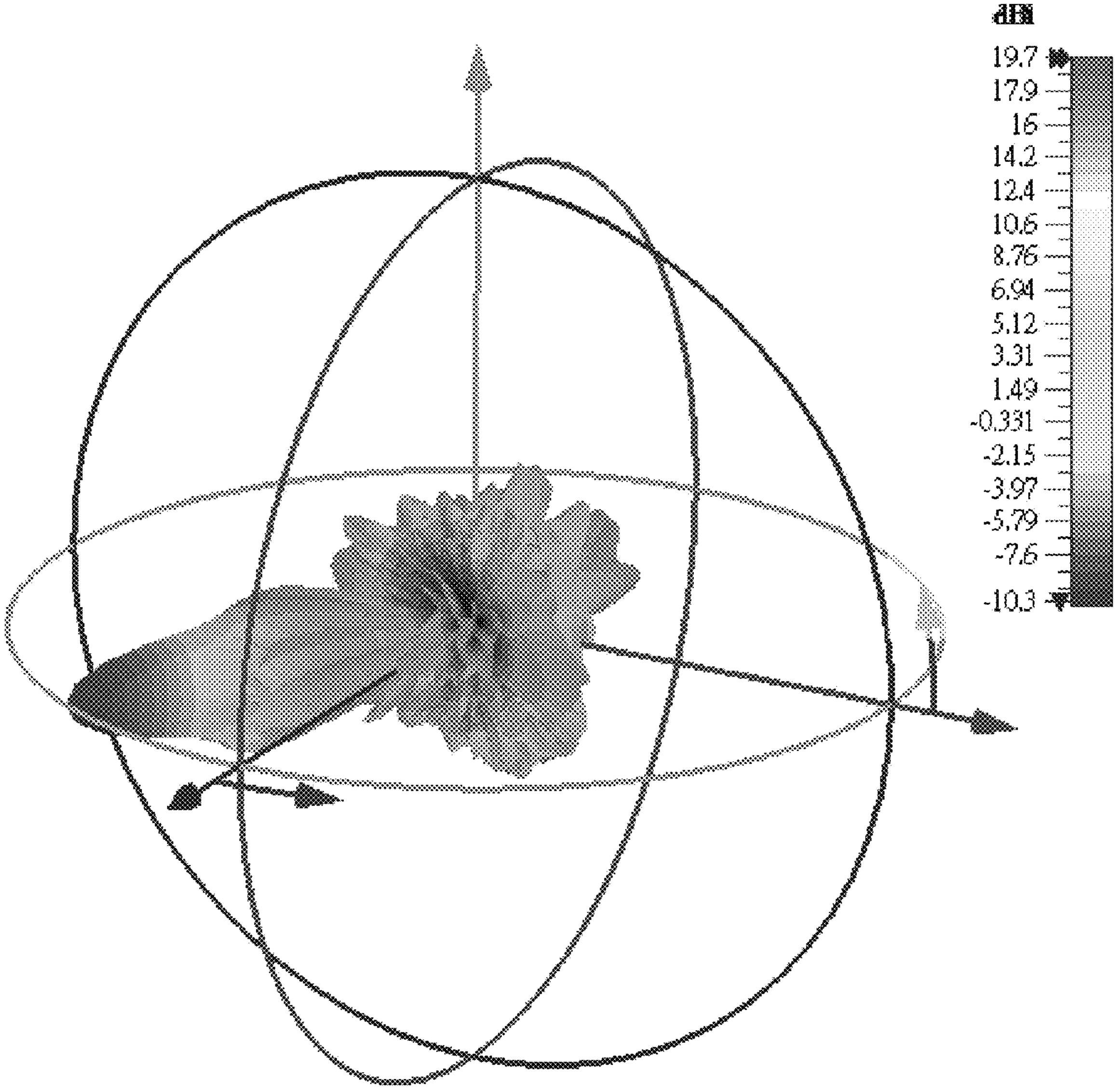
Figure 6G:
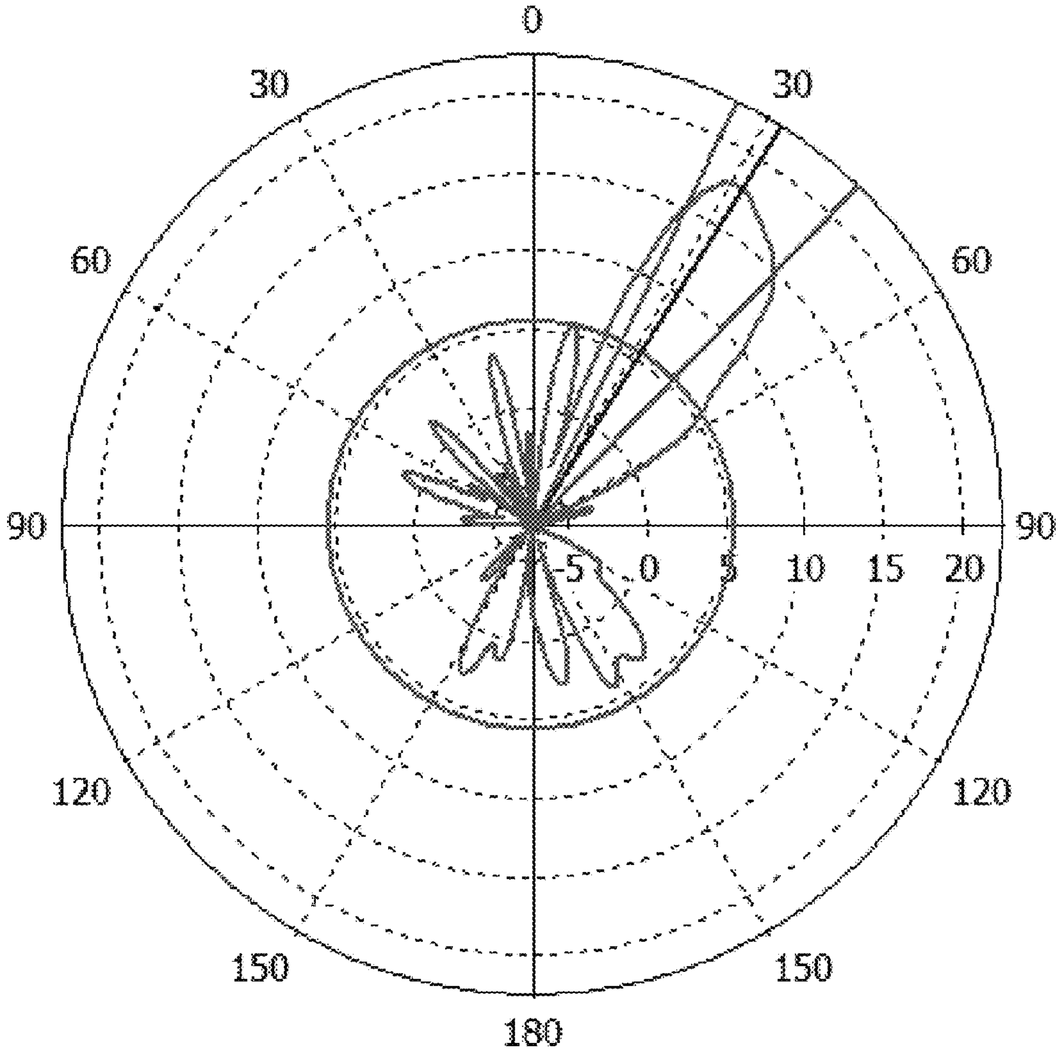
FIG. 6*g* to FIG. 6L are simulation diagrams showing the beam focusing and directing effect when a heterogeneous structure according to an example for comparison is applied to an antenna and has an offset angle of 0 degrees.
Figure 6H:
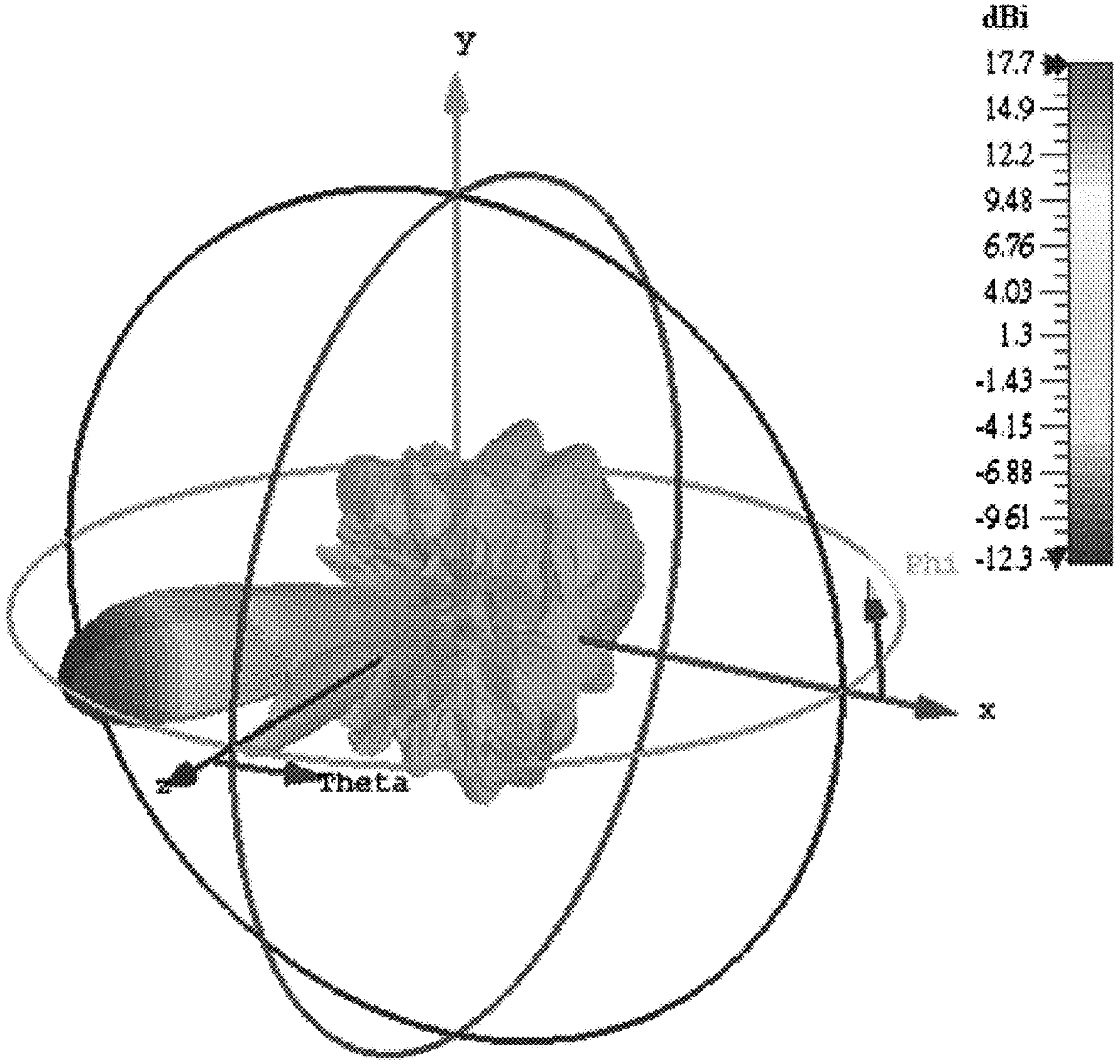
Figure 6I:
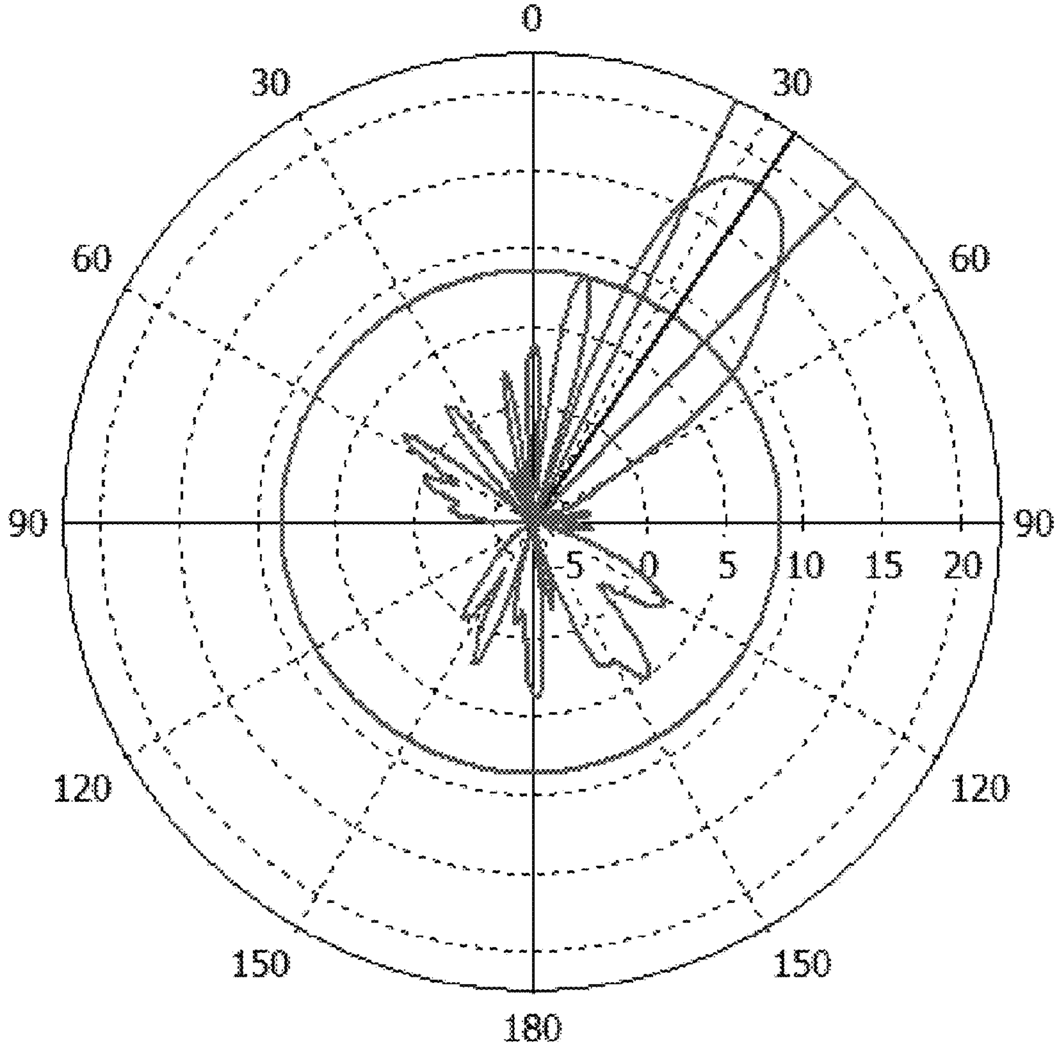
Figure 6J:
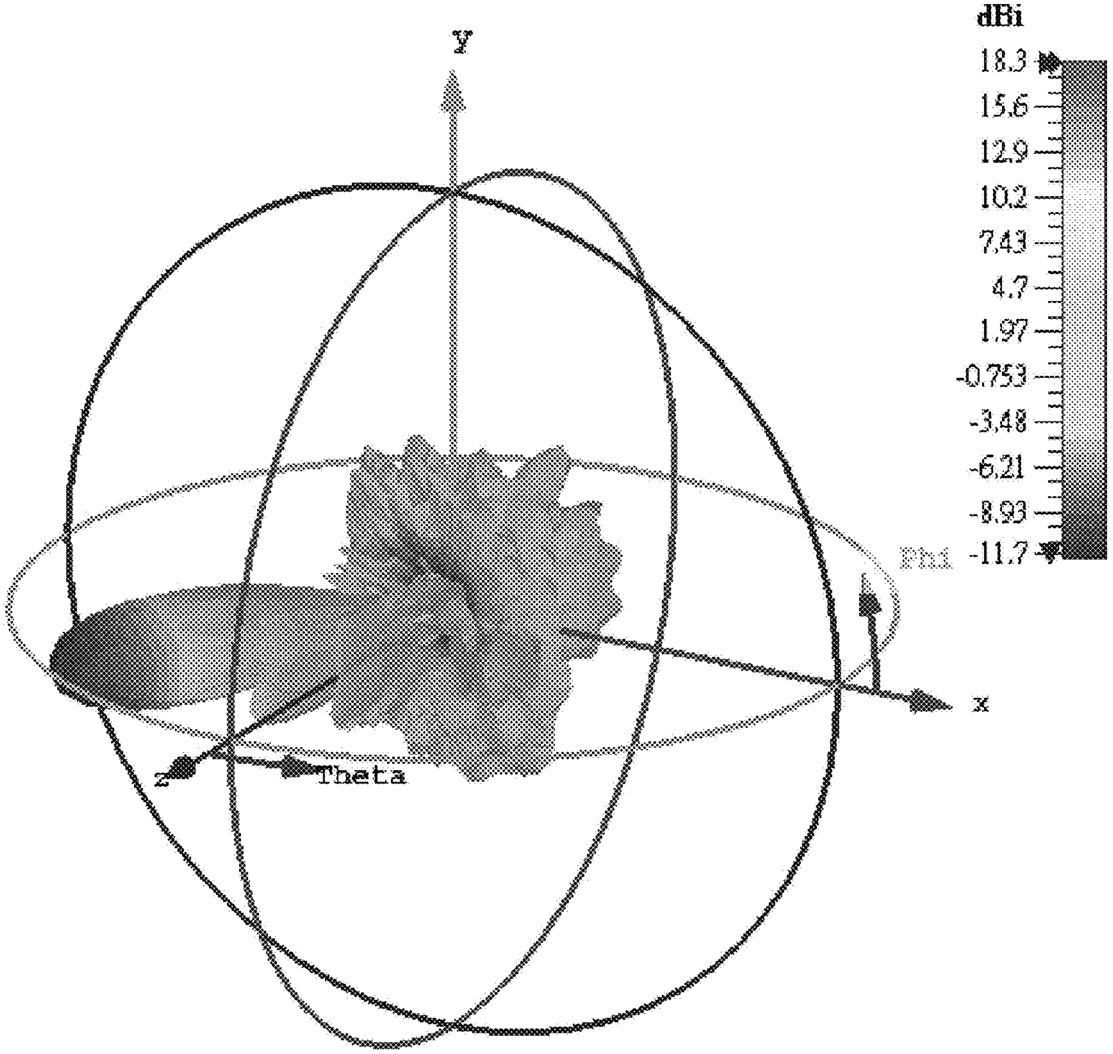
Figure 6K:
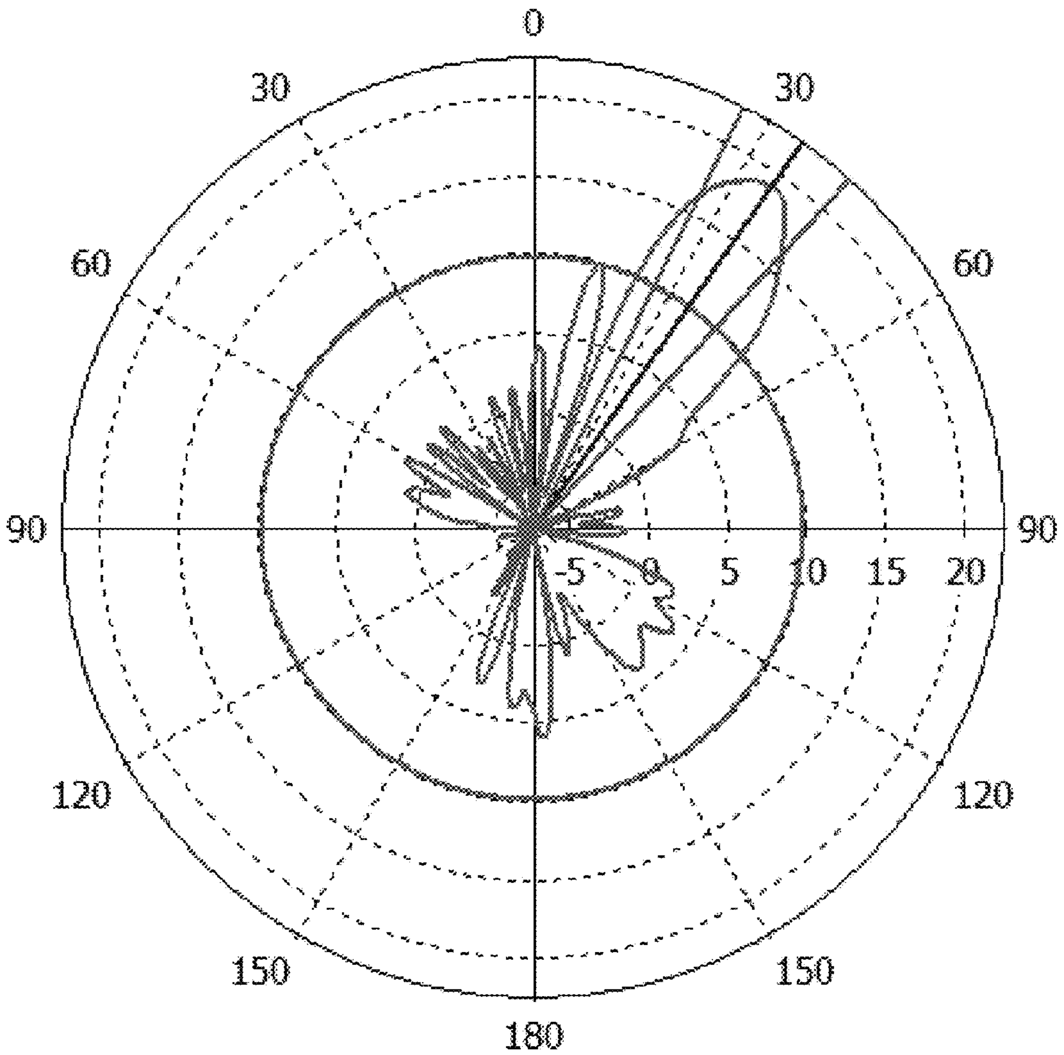
Figure 6L:
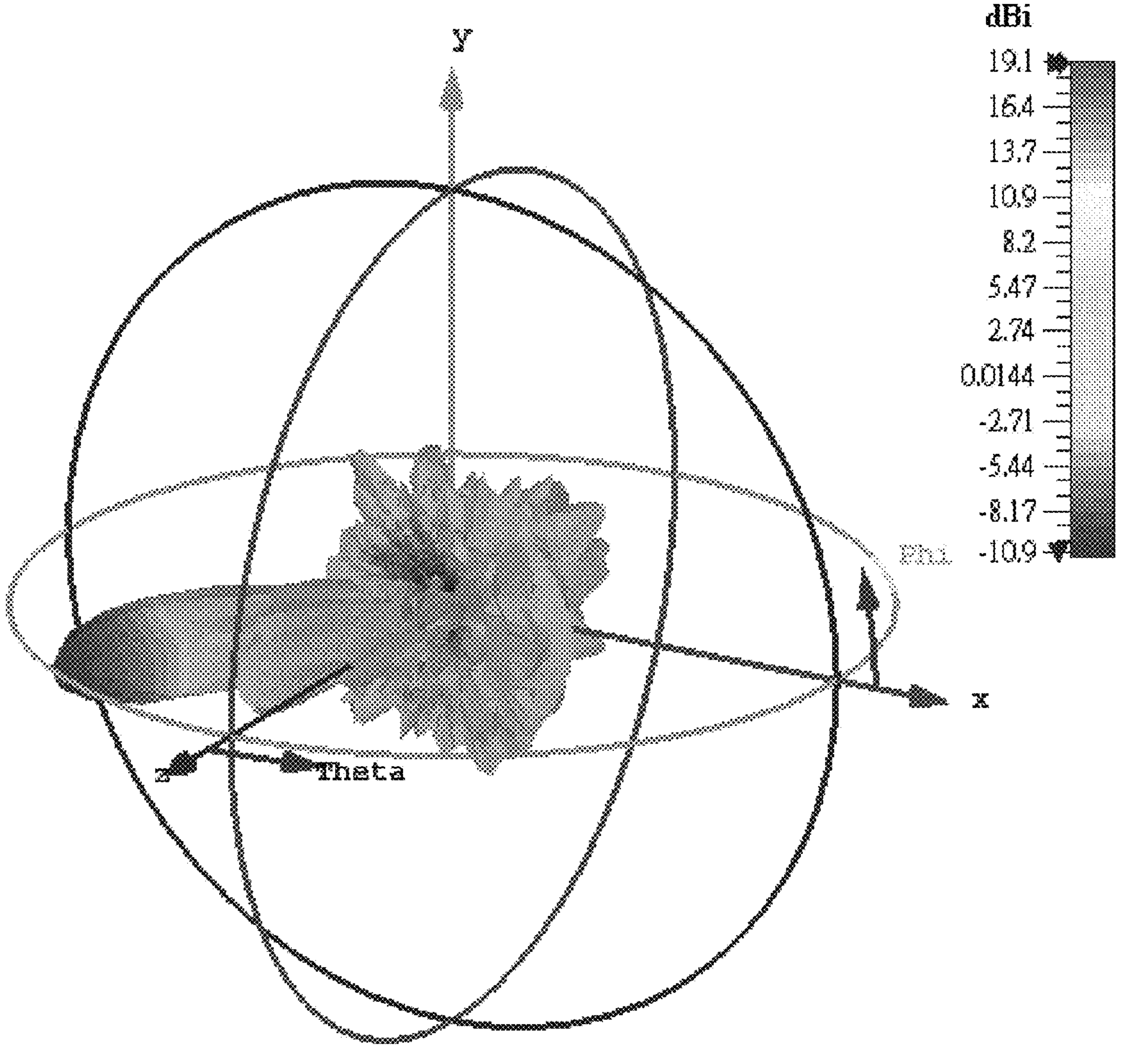
Figure 7A:
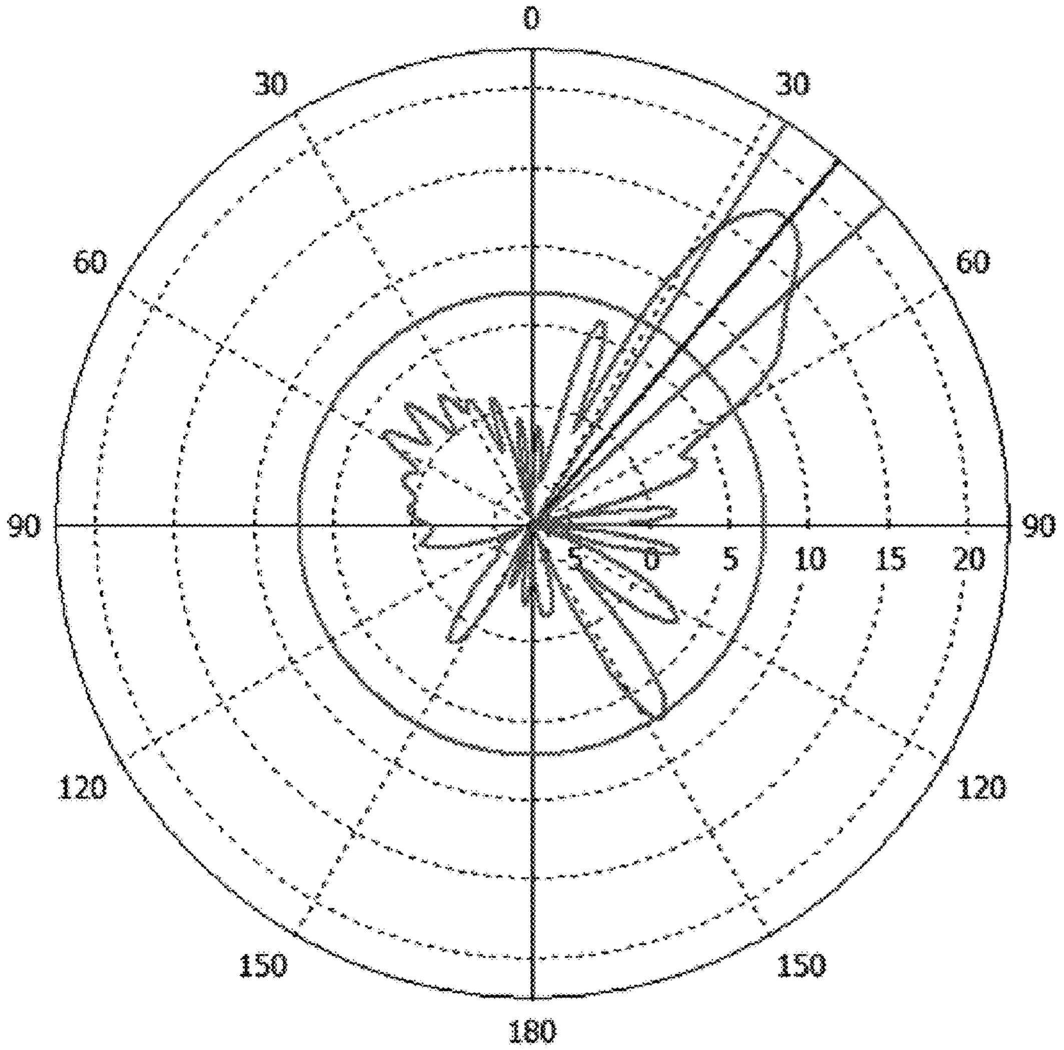
FIG. 7*a* to FIG. 7*f* are simulation diagrams showing the beam focusing and directing effect when the electromagnetic wave guidance and beam reshaping structure in FIG. 1 is applied to an antenna and has an offset angle of 45 degrees.
Figure 7B:
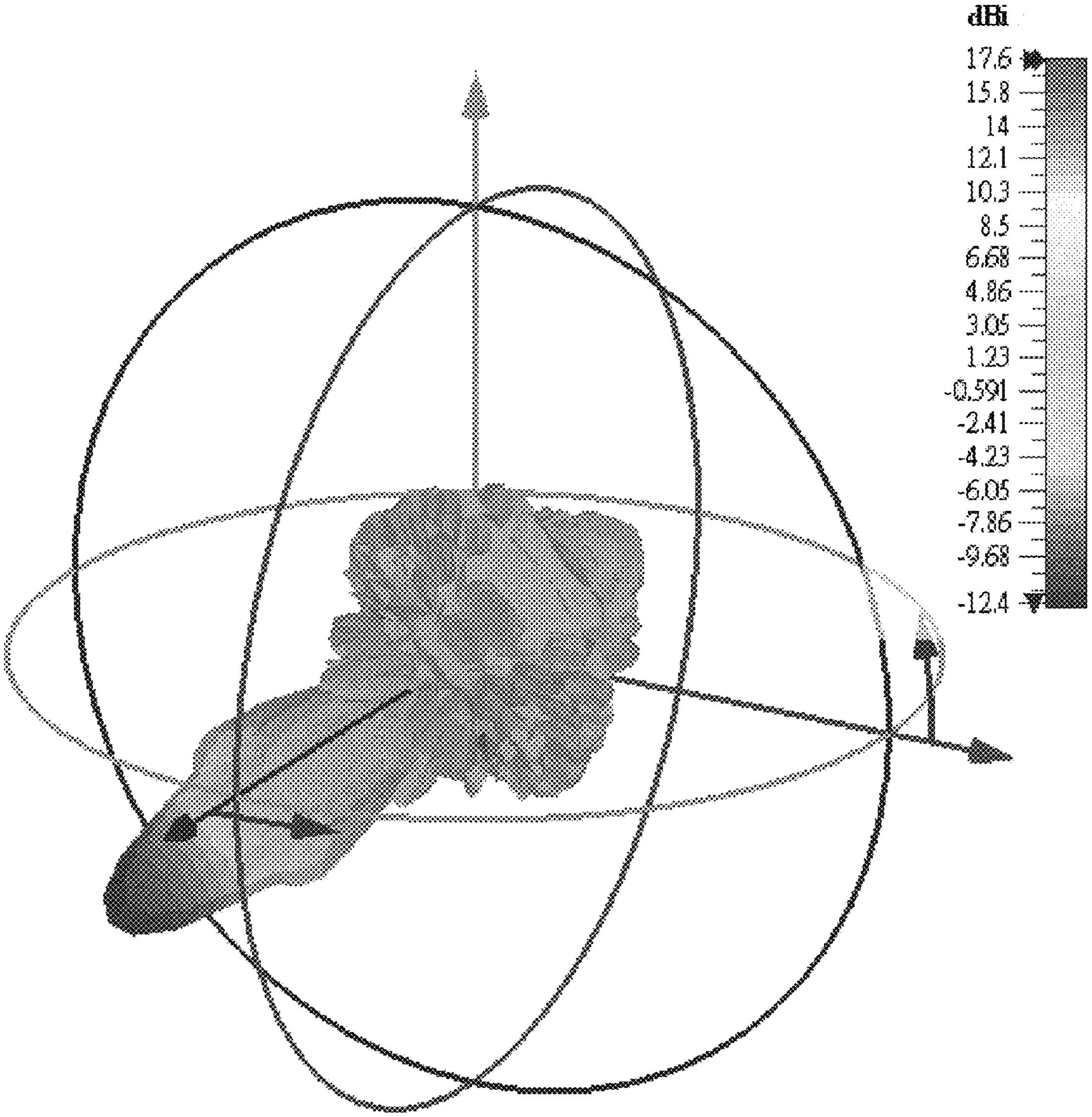
Figure 7C:
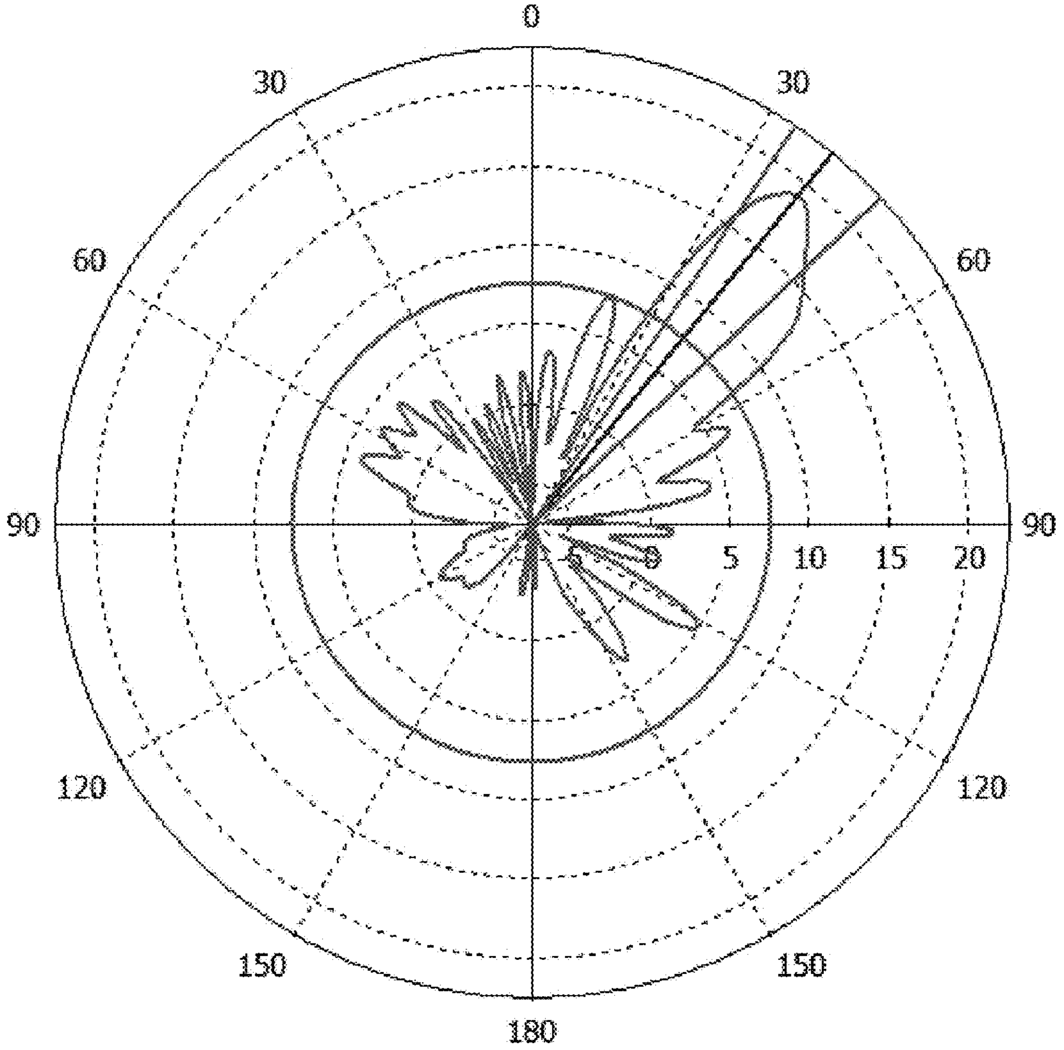
Figure 7D:
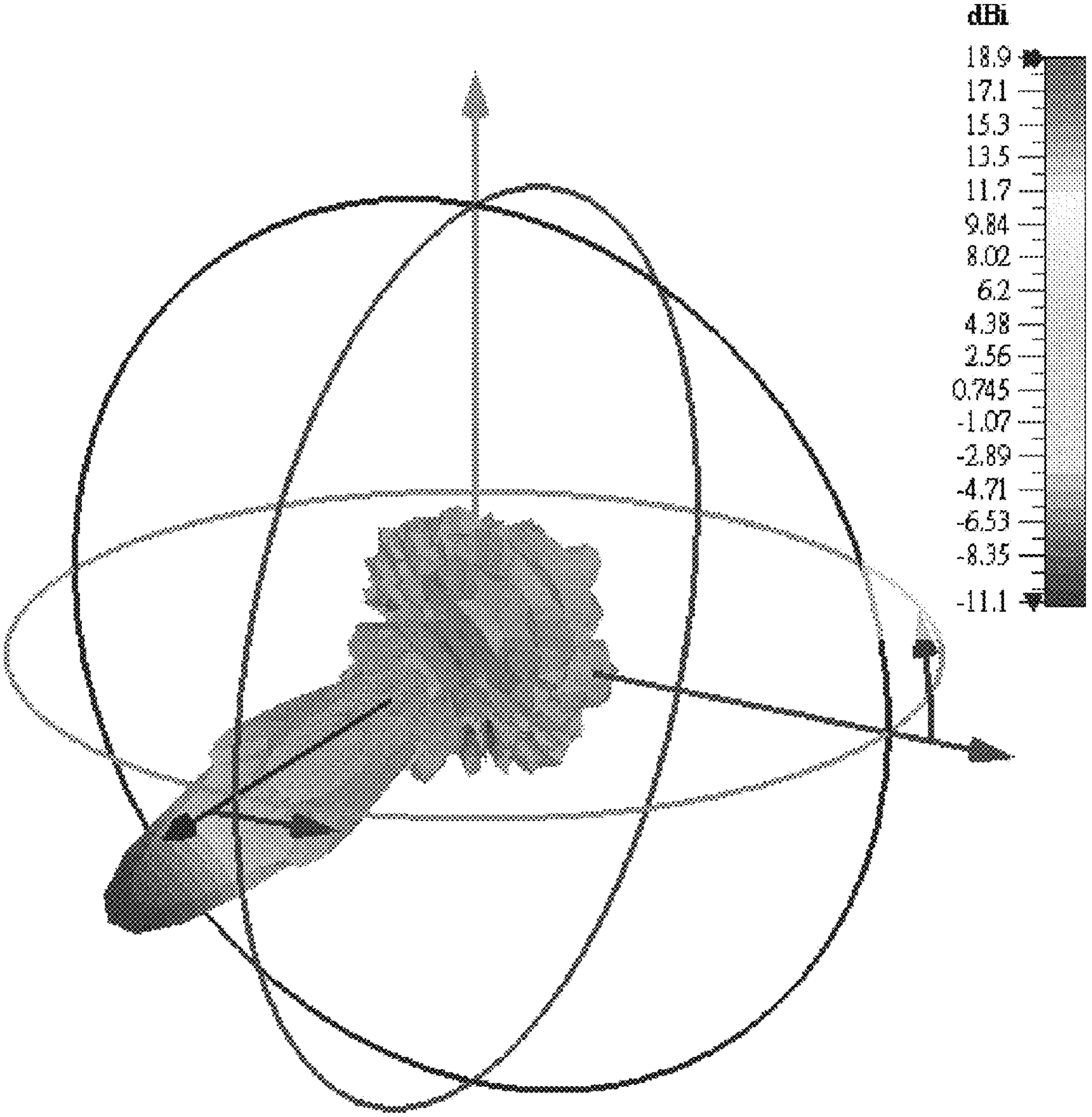
Figure 7E:
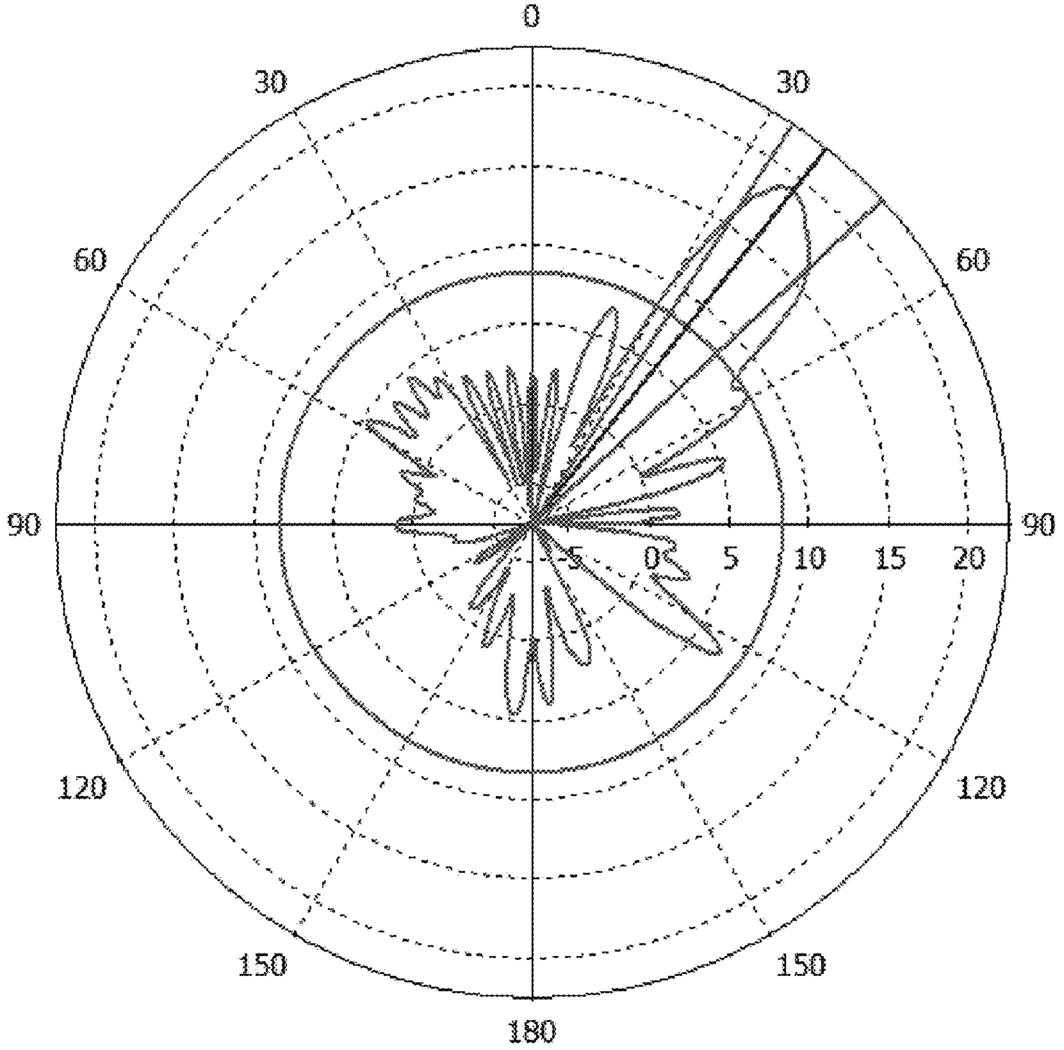
Figure 7F:
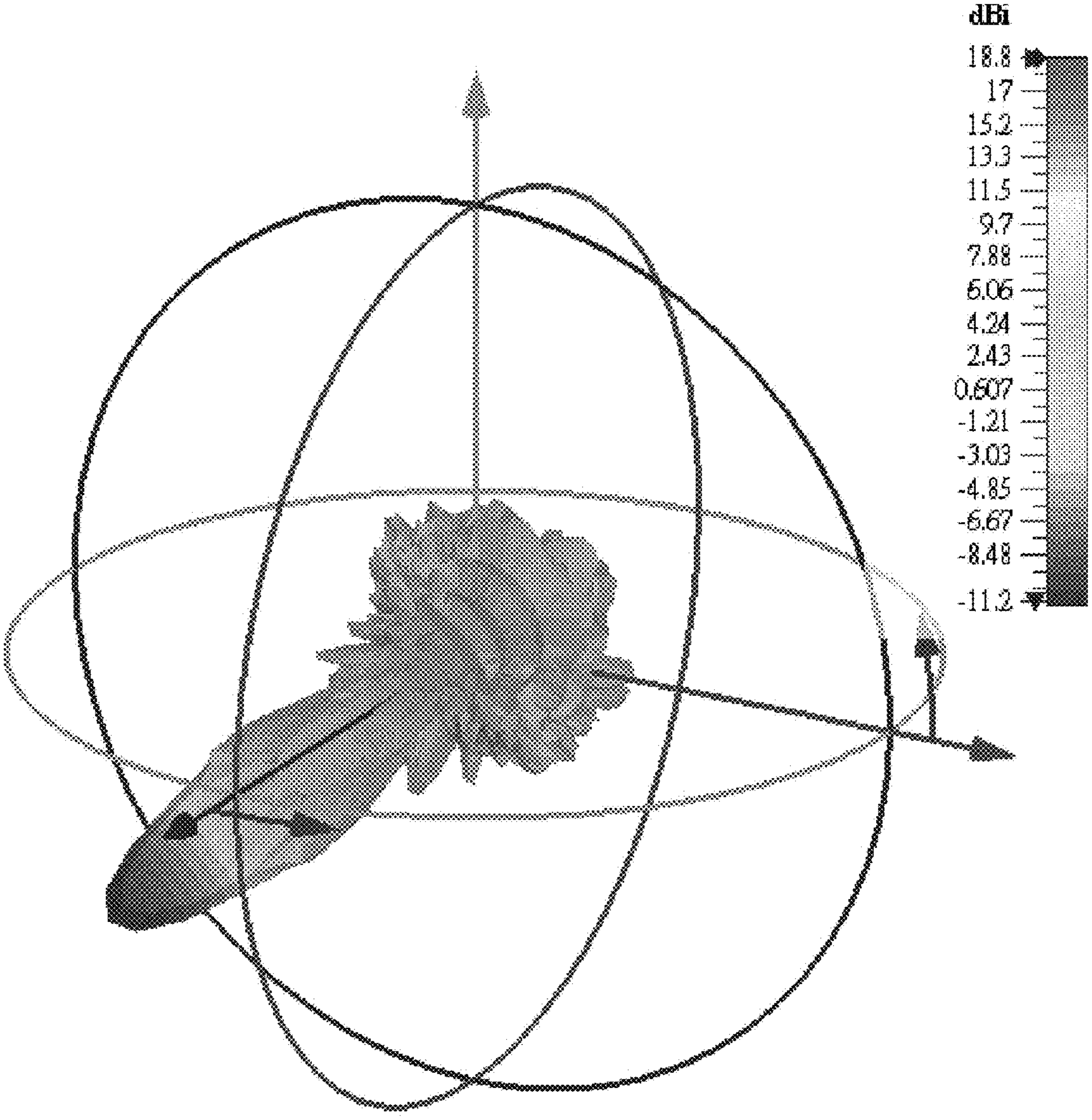
Figure 7G:
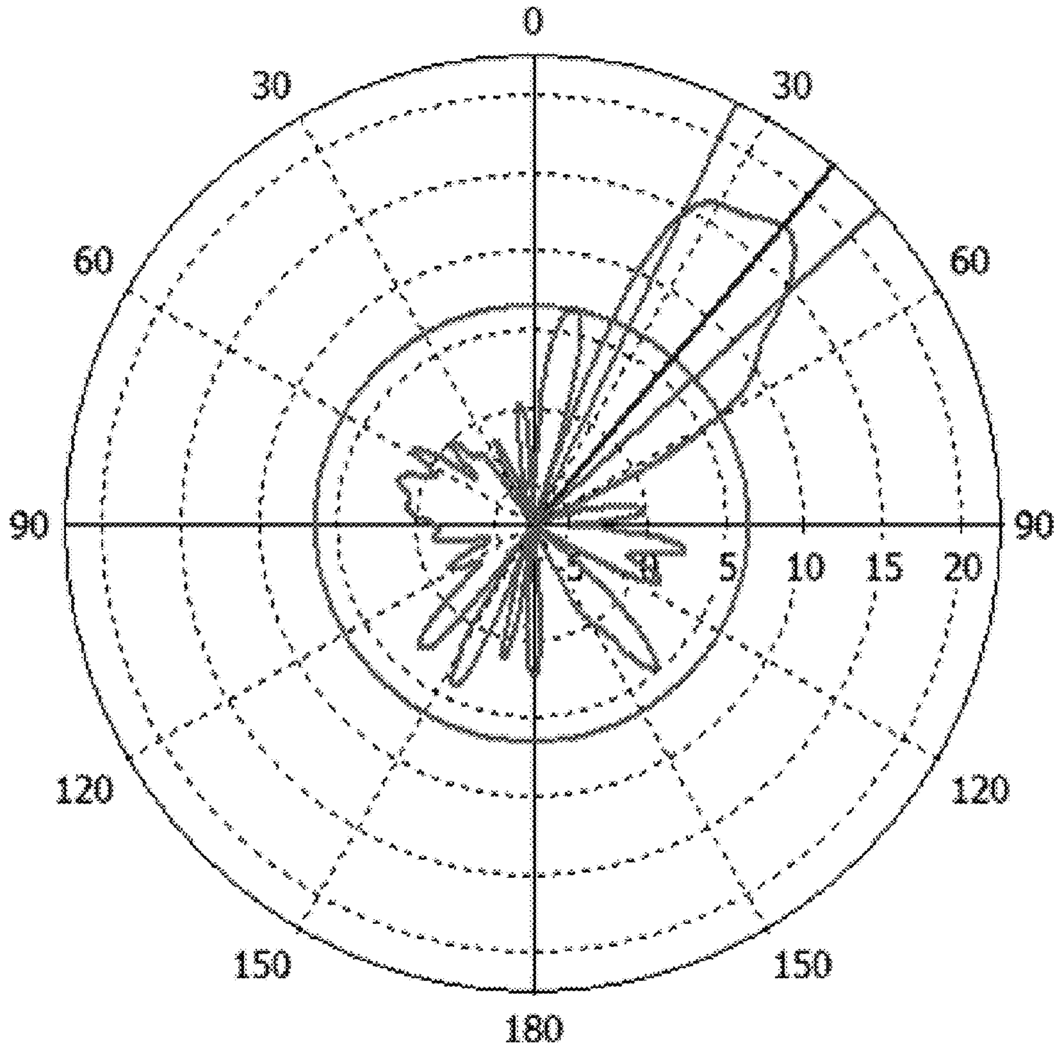
FIG. 7*g* to FIG. 7L are simulation diagrams showing the beam focusing and directing effect when a heterogeneous structure according to an example for comparison is applied to an antenna and has an offset angle of 45 degrees.
Figure 7H:
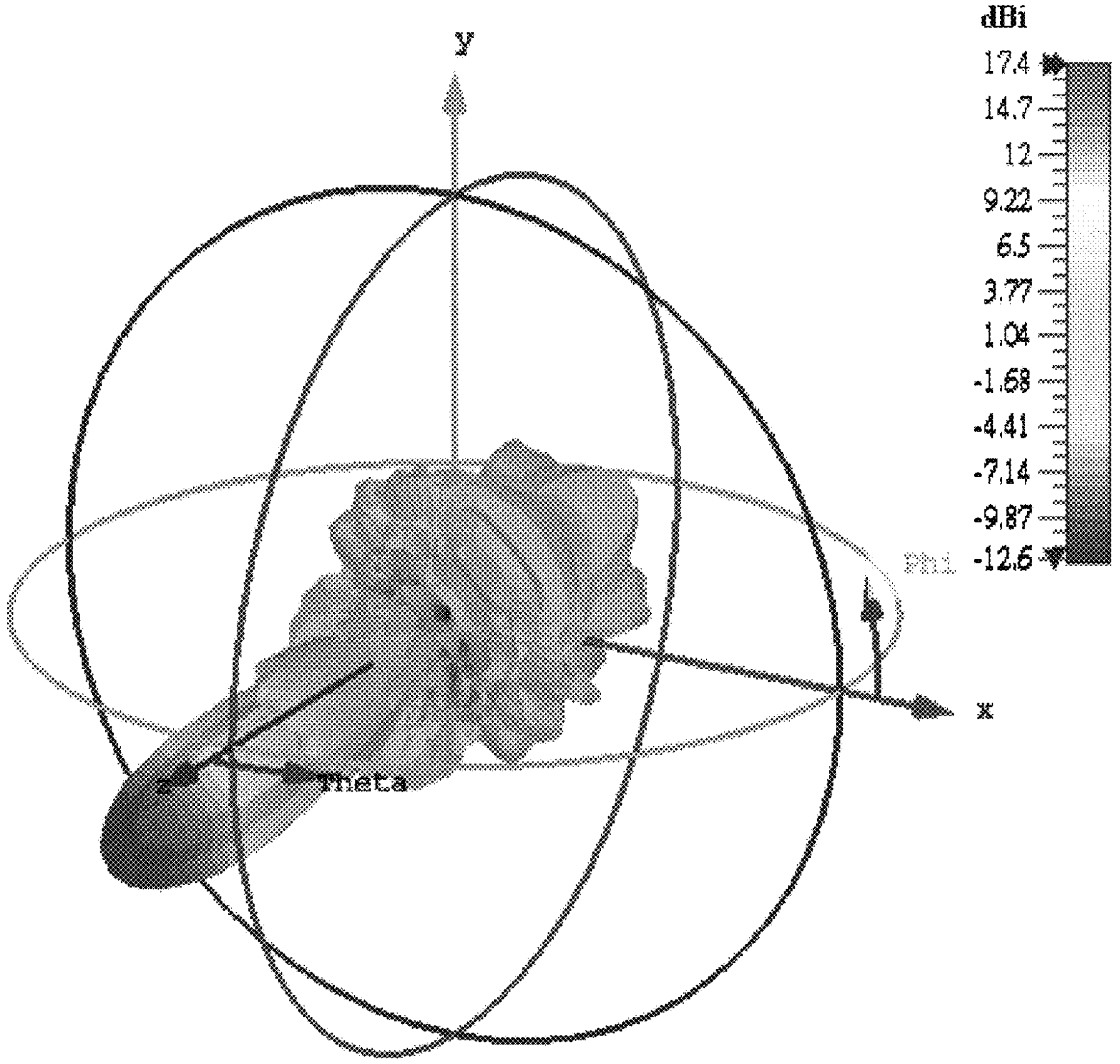
Figure 7I:
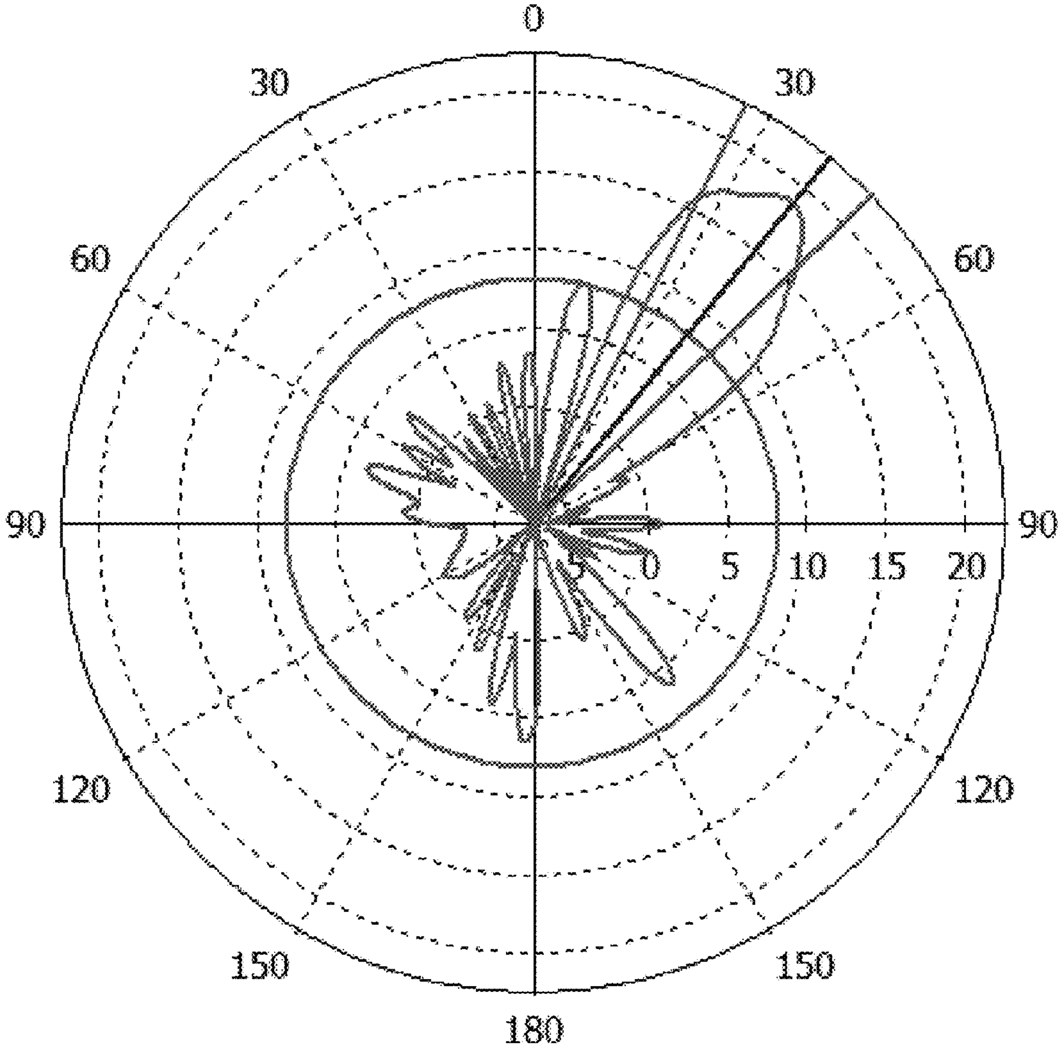
Figure 7J:
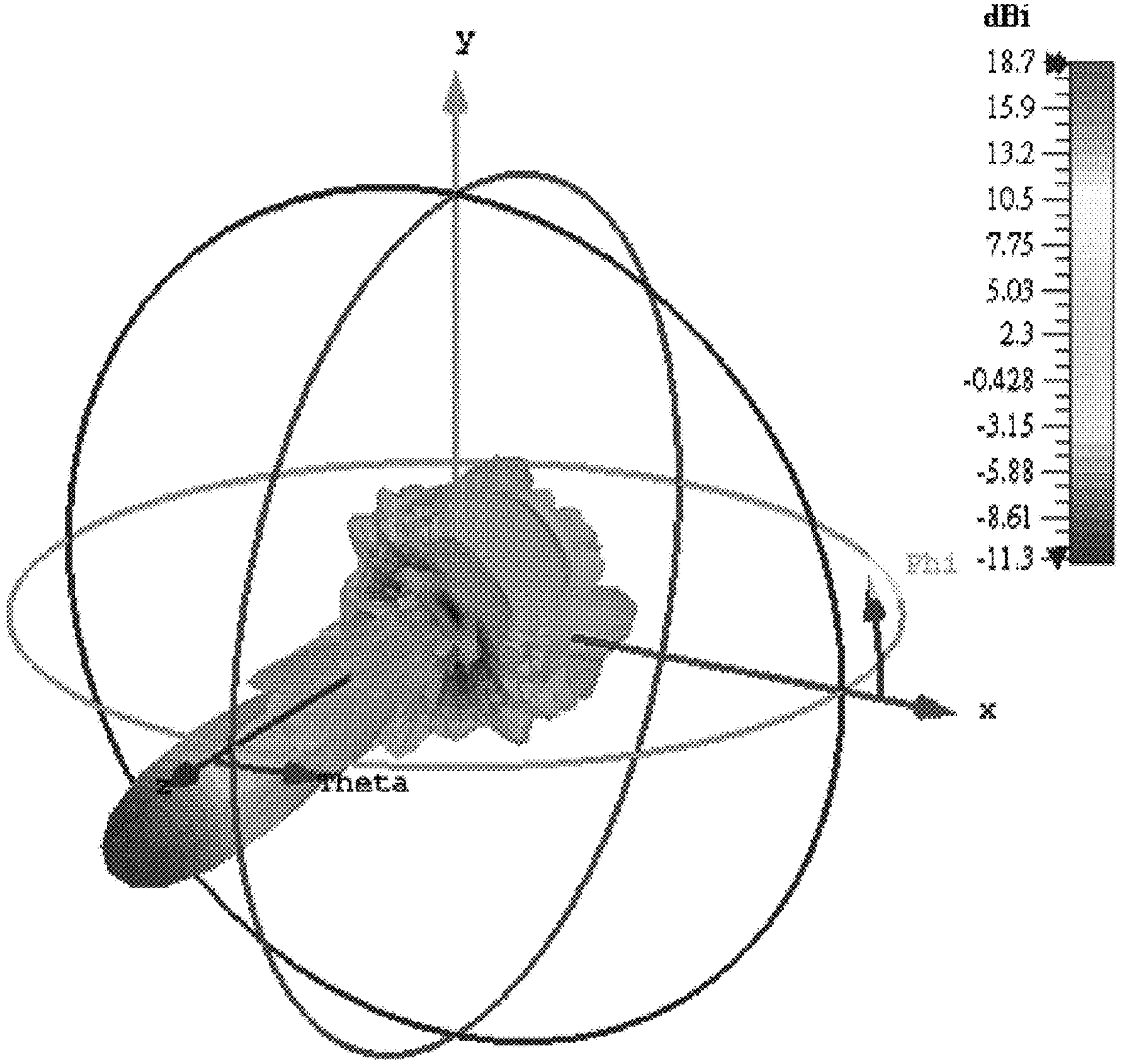
Figure 7K:
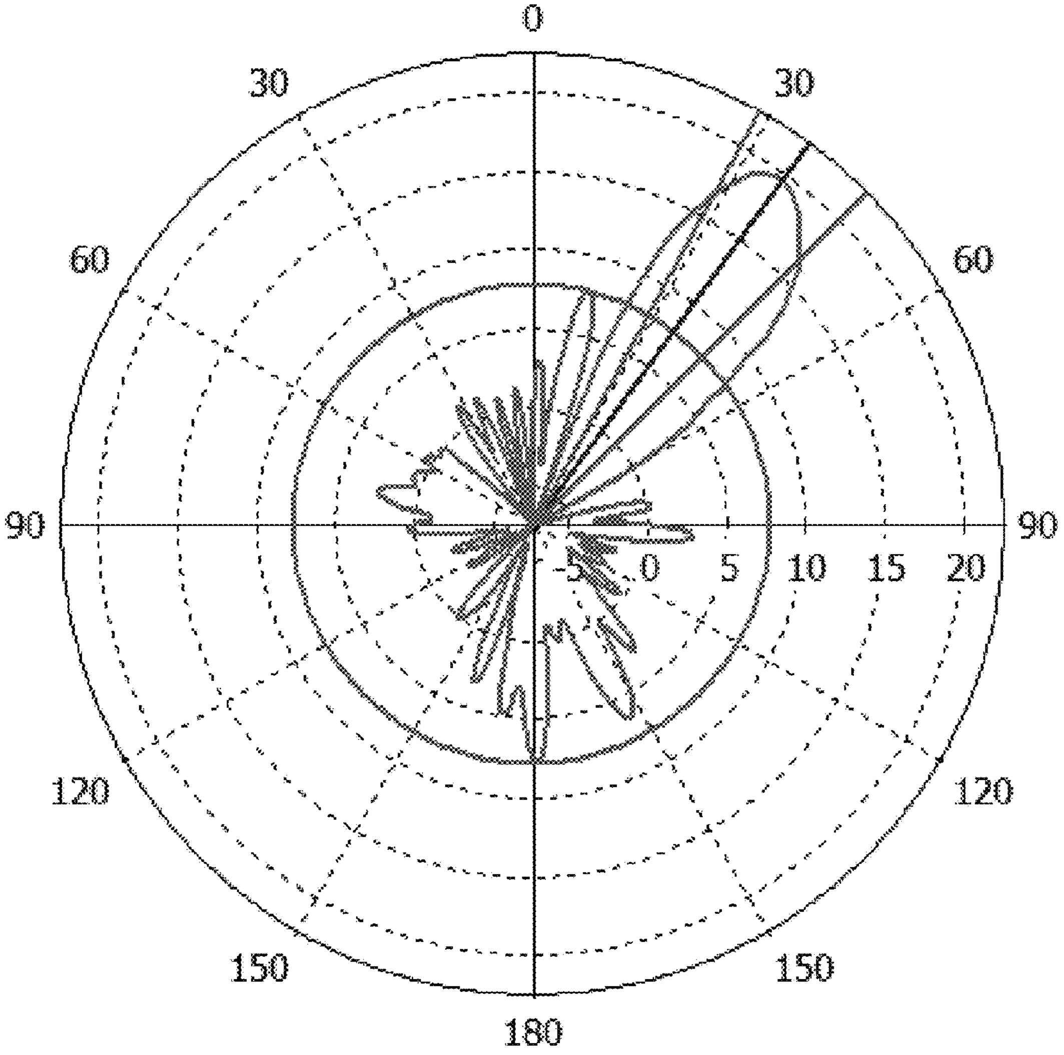
Figure 7L:
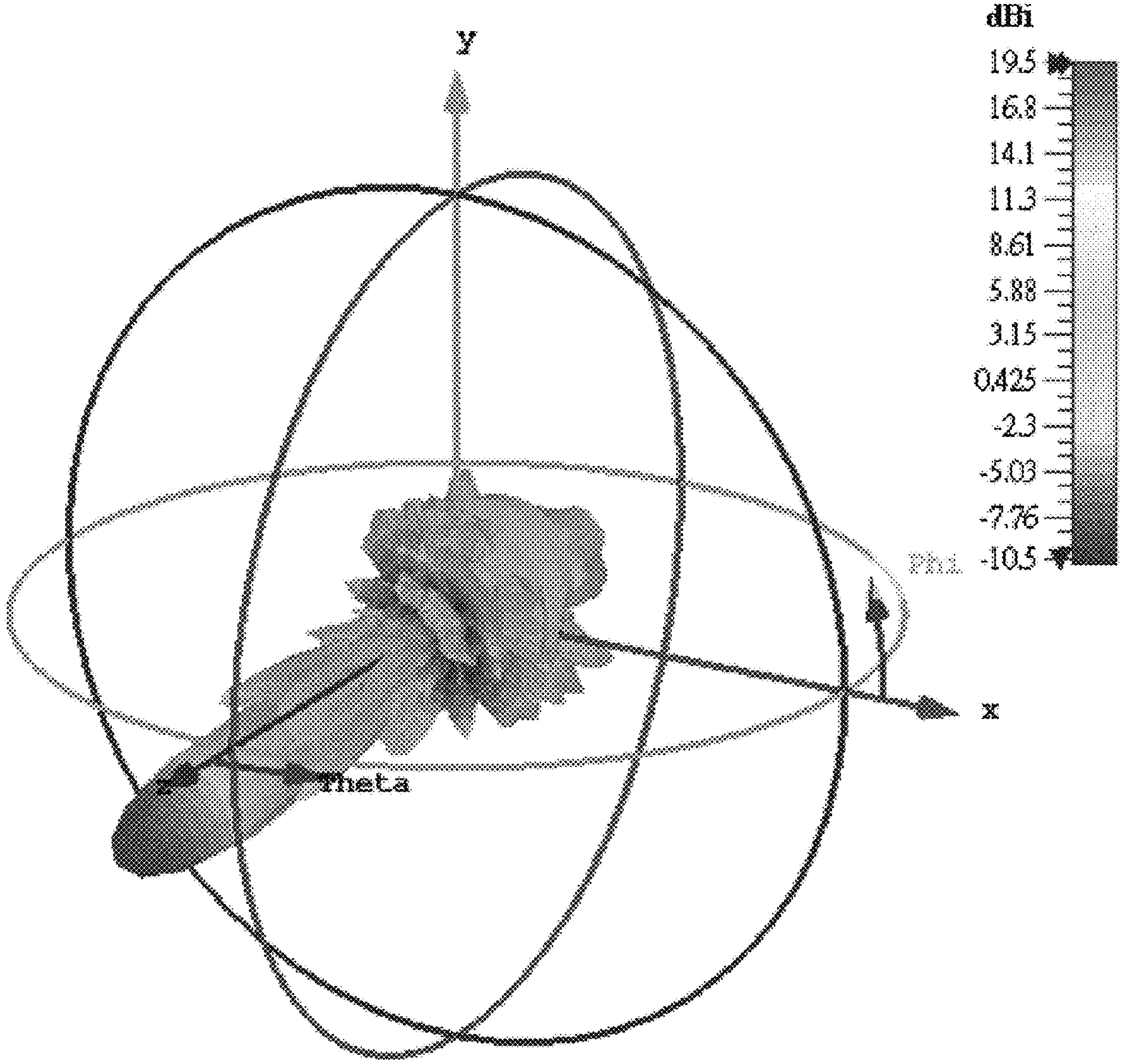

Please refer to FIG. 5, which is a gain effect chart when the electromagnetic wave guidance and beam reshaping structure 100 in FIG. 1 is applied to an antenna, where the chart selects a frequency range from 135 to 165 GHz. The line AA in FIG. 5 refers to the gain of electromagnetic waves of only a waveguide antenna; as shown, the gain is only approximately between 6.5 dB and 7.3 dB. The line BB in FIG. 5 refers to the gain of electromagnetic waves of a flat lens comprising hollow structures combined with a waveguide antenna; as shown, the gain is only approximately between 17.7 dB and 20.1 dB. The line BB shows that the gain is limited since the hollow structures only can reduce the equivalent dielectric constant distribution and the maximum value of the equivalent dielectric constant distribution is mainly determined by the material of the substrate of the flat lens. The line CC in FIG. 5 refers to the gain of electromagnetic waves of the electromagnetic wave guidance and beam reshaping structure 100; as shown, the gain can live up to a level approximately ranging between 23.1 dB and 25.3 dB.

Please refer to FIG. 6*a* to FIG. 6*f*, which are simulation diagrams showing the beam focusing and directing effect when the electromagnetic wave guidance and beam reshaping structure 100 in FIG. 1 being applied to an antenna has a feeding position offset by 3 millimeters from the central axis CA and has an offset angle of 0 degrees. FIG. 6*a* to FIG. 6*b*, FIG. 6*c* to FIG. 6*d*, and FIG. 6*e* to FIG. 6*f* respectively show the electromagnetic waves achieve the beam focusing goal at 135 GHz, 150 GHz and 165 GHz when the electromagnetic wave guidance and beam reshaping structure 100 adopting the metal patterns 120 of the above-mentioned embodiment is applied to an antenna.

In an example for comparison, a heterogeneous structure composed of materials of varied dielectric constants and thus having a non-uniform dielectric constant distribution is also applied to an antenna. Please refer to FIG. 6*g* to FIG. 6*l*, which are simulation diagrams showing the beam focusing and directing effect when a heterogeneous structure according to the example for comparison being applied to an antenna has a feeding position offset by 3 millimeters from the central axis CA and has an offset angle of 0 degrees. FIG. 6*g* to FIG. 6*h*, FIG. 6*i* to FIG. 6*j*, and FIG. 6*k* to FIG. 6L respectively show the electromagnetic waves achieve the beam focusing goal at 135 GHZ, 150 GHz and 165 GHz when the heterogeneous structure of the example for comparison is applied to an antenna.

As can be seen from FIG. 6*a* to FIG. 6*f* and FIG. 6*g* to FIG. 6L, the electromagnetic wave guidance and beam reshaping structure 100 of one embodiment of the present disclosure and the heterogeneous structure of a contrast example are both able to make electromagnetic waves focused at the selected feeding position, that is, they both are beneficial to improve the directivity of electromagnetic wave propagation. As shown, both of them provide good guidance for electromagnetic waves and effectively reshape the wave distribution in the beamspace.

Please refer to FIG. 7*a* to FIG. 7*f*, which are simulation diagrams showing the beam focusing and directing effect when the electromagnetic wave guidance and beam reshaping structure 100 in FIG. 1 being applied to an antenna has a feeding position offset by 3 millimeters from the central axis CA and has an offset angle of 45 degrees. FIG. 7*a* to FIG. 7*b*, FIG. 7*c* to FIG. 7*d*, and FIG. 7*e* to FIG. 7*f* respectively show the electromagnetic waves achieve the beam focusing goal at 135 GHz, 150 GHz and 165 GHz when the electromagnetic wave guidance and beam reshaping structure 100 adopting the metal patterns 120 of the above-mentioned embodiment is applied to an antenna.

In an example for comparison, a heterogeneous structure composed of materials of varied dielectric constants and thus having a non-uniform dielectric constant distribution is also applied to an antenna. Please refer to FIG. 7*g* to FIG. 7L, which are simulation diagrams showing the beam focusing and directing effect when a heterogeneous structure according to the example for comparison being applied to an antenna has a feeding position offset by 3 millimeters from the central axis CA and has an offset angle of 45 degrees. FIG. 7*g* to FIG. 7*h*, FIG. 7*i* to FIG. 7*j*, and FIG. 7*k* to FIG. 7L respectively show the electromagnetic waves achieve the beam focusing goal at 135 GHz, 150 GHz and 165 GHz when the heterogeneous structure of the example for comparison is applied to an antenna.

As can be seen from FIG. 7*a* to FIG. 7*f* and FIG. 7*g* to FIG. 7L, the electromagnetic wave guidance and beam reshaping structure 100 of one embodiment of the present disclosure and the heterogeneous structure of a contrast example are both able to make electromagnetic waves focused at the selected feeding position, that is, they both are beneficial to improve the directivity of electromagnetic wave propagation. As shown, both of them provide good guidance for electromagnetic waves and effectively reshape the wave distribution in the beamspace. As discussed, the electromagnetic wave guidance and beam reshaping structure 100 whose substrate 110 is made of homogeneous material is able to achieve a similar or better effects than the heterogeneous structure adopting heterogeneously distributed material. Further, the manufacture of heterogeneously distributed material involves combining various materials into one piece and there is more complex than producing a homogeneous substrate. Thus, the electromagnetic wave guidance and beam reshaping structure 100 is easy to produce and more suitable for mass production since it only needs to perform processes of metal pattern and/or hollow structure on the substrate 110.

Figure 8:
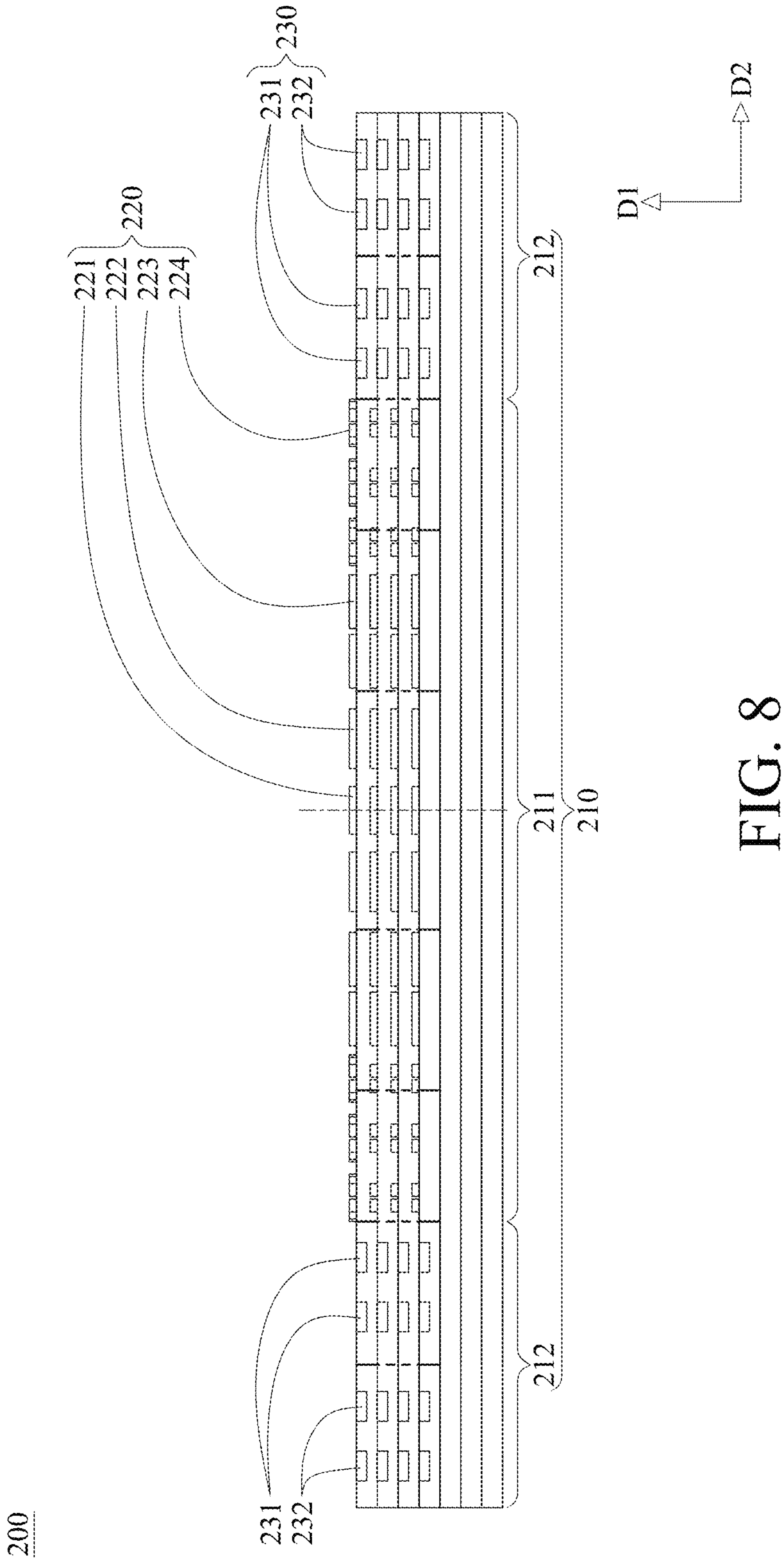
FIG. 8 is a cross-sectional view of an electromagnetic wave guidance and beam reshaping structure according to another embodiment of the present disclosure.

Note that the aforementioned configurations and arrangements of the metal patterns 120 on the central portion 111 of each substrate 110 and the hollow structures 130 through the peripheral portion 112 of each substrate 110 are exemplary and not intended to limit the present disclosure. For example, please refer to FIG. 8, which is a cross-sectional view of an electromagnetic wave guidance and beam reshaping structure 200 according to another embodiment of the present disclosure. The electromagnetic wave guidance and beam reshaping structure 200 provided in this embodiment is similar to the electromagnetic wave guidance and beam reshaping structure 100 in the above-mentioned embodiment, and only the difference between the electromagnetic wave guidance and beam reshaping structure 200 and the electromagnetic wave guidance and beam reshaping structure 100, as well as necessary elements, will be illustrated hereinafter.

Among the electromagnetic wave guidance and beam reshaping structure 200, the first metal patterns 221 to the fourth metal patterns 224 of the metal patterns 220 are only disposed on the central portions 211 of several substrates 210, and the first hollow structures 231 and the second hollow structures 232 of the hollow structures 230 are only disposed in the peripheral portions 212 of several substrates 210. And, the depths of the first hollow structures 231 and the second hollow structures 232 are less than the thickness of the substrate 210 and can be considered as blind holes. The metal patterns 220 and the hollow structures 230 can be selectively disposed on or in part of substrates 210 according to actual requirements, and the depths of the hollow structures 230 can also be determined according to actual requirements, and therefore the electromagnetic wave guidance and beam reshaping structure 200 can be designed flexibly.

Figure 9:
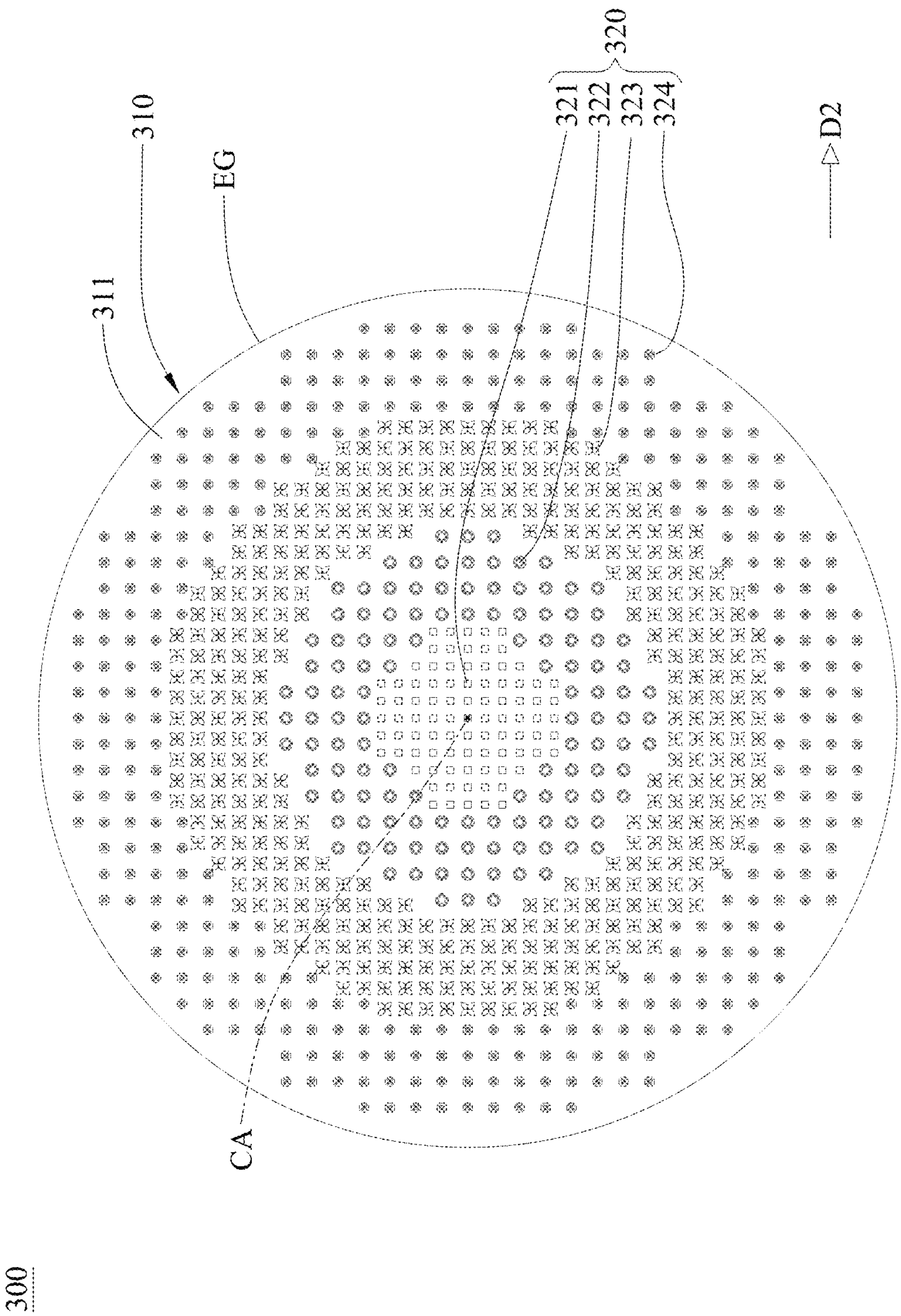
FIG. 9 is a top view of a central portion of an electromagnetic wave guidance and beam reshaping structure according to yet another embodiment of the present disclosure.
Figure 10:
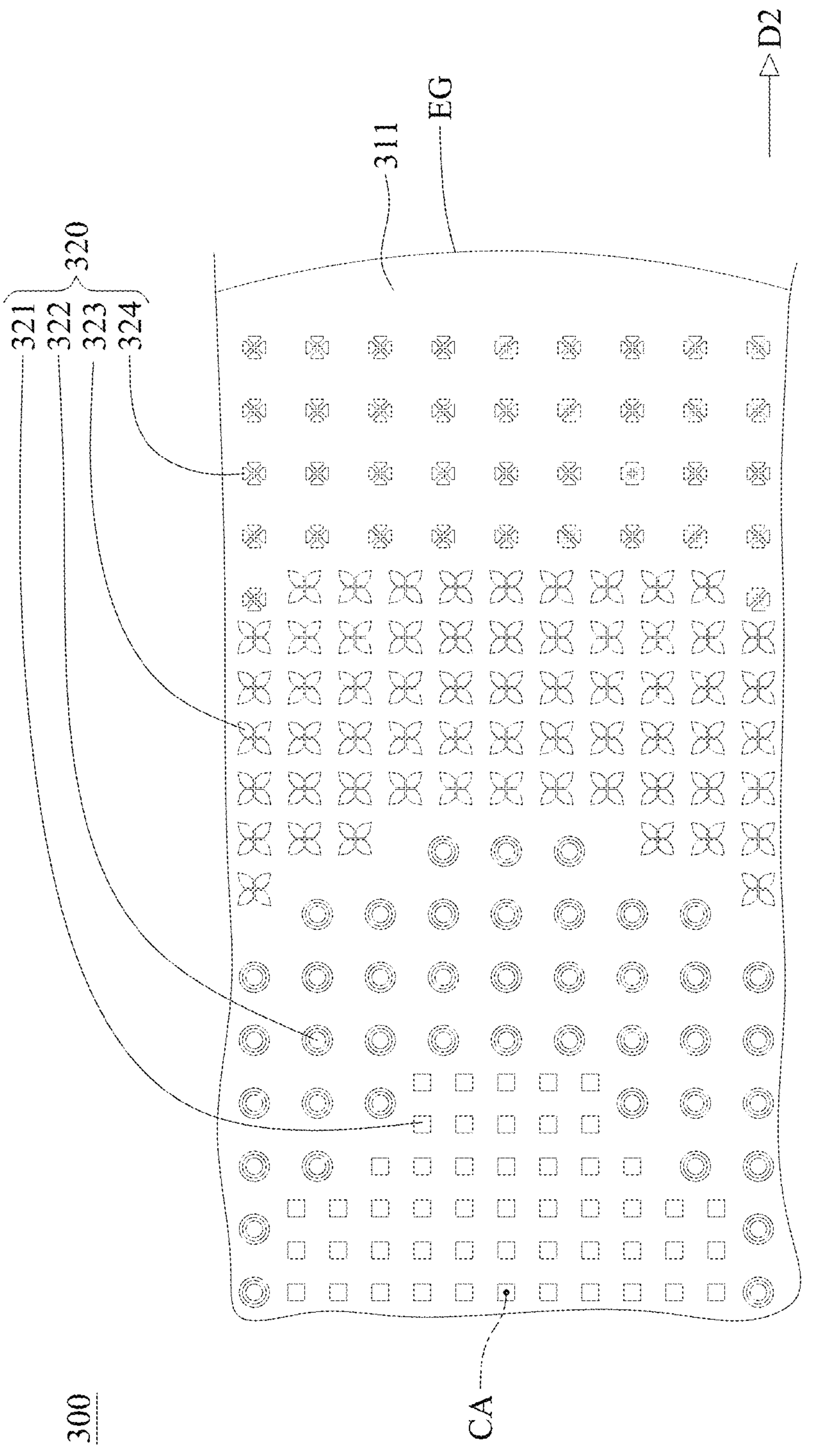
FIG. 10 is a partial and enlarged view of the central portion in FIG. 9.

In the above-mentioned embodiments, the substrates 110 and 210 are hexagonal plates, and the surface area of every single first metal pattern 121 or 221 to the surface area of every single fourth metal pattern 124 or 224 gradually reduce in the second direction D2 from the central axis CA at the innermost of the substrate 110 or 210 to the edge EG at the outermost of the substrate 110 or 210. However, the present disclosure is not limited thereto. Please refer to FIG. 9 to FIG. 10, where FIG. 9 is a top view of a central portion 311 of an electromagnetic wave guidance and beam reshaping structure 300 according to yet another embodiment of the present disclosure, and FIG. 10 is a partial and enlarged view of the central portion 311 in FIG. 9. The electromagnetic wave guidance and beam reshaping structure 300 provided in this embodiment is similar to the electromagnetic wave guidance and beam reshaping structure 100 in the above-mentioned embodiment, and only the difference between the electromagnetic wave guidance and beam reshaping structure 300 and the electromagnetic wave guidance and beam reshaping structure 100, as well as necessary elements, will be illustrated hereinafter.

In the electromagnetic wave guidance and beam reshaping structure 300, the central portion 311 is circular; every single third metal pattern 323 has the largest surface area, every single second metal pattern 322 has the second largest surface area, and each of every single first metal pattern 321 and every single fourth metal pattern 324 has the smallest surface area; also, each adjacent two second metal patterns 322 and each adjacent two fourth metal patterns 324 have the longest distance therebetween (interval), each adjacent two third metal patterns 323 has the second longest distance therebetween (interval), and each adjacent two first metal patterns 321 has the shortest longest distance therebetween (interval). Accordingly, the third metal patterns 323 have the highest surface area proportion on the unit surface area of the substrate 310, the first metal patterns 321 have the second highest surface area proportion on the unit surface area of the substrate 310, the second metal patterns 322 have the third highest surface area proportion on the unit surface area of the substrate 310, and the fourth metal patterns 324 have the lowest surface area proportion on the unit surface area of the substrate 310, such that surface area proportions of the metal patterns 320 on each unit surface area of the substrate 310 in the second direction D2 from the central axis CA at the innermost of the substrate 310 to the edge EG at the outermost of the substrate 310 are gradually reduced, then gradually increased, and then gradually reduced again. Therefore, the equivalent dielectric constant of the electromagnetic wave guidance and beam reshaping structure 300 at the central portion 311 along the direction from the central axis CA at the innermost of the substrate 310 to the edge EG at the outermost of the substrate 310 can be gradually reduced, then gradually increased, and then gradually reduced again so as to meet a particular requirement.

Figure 11:
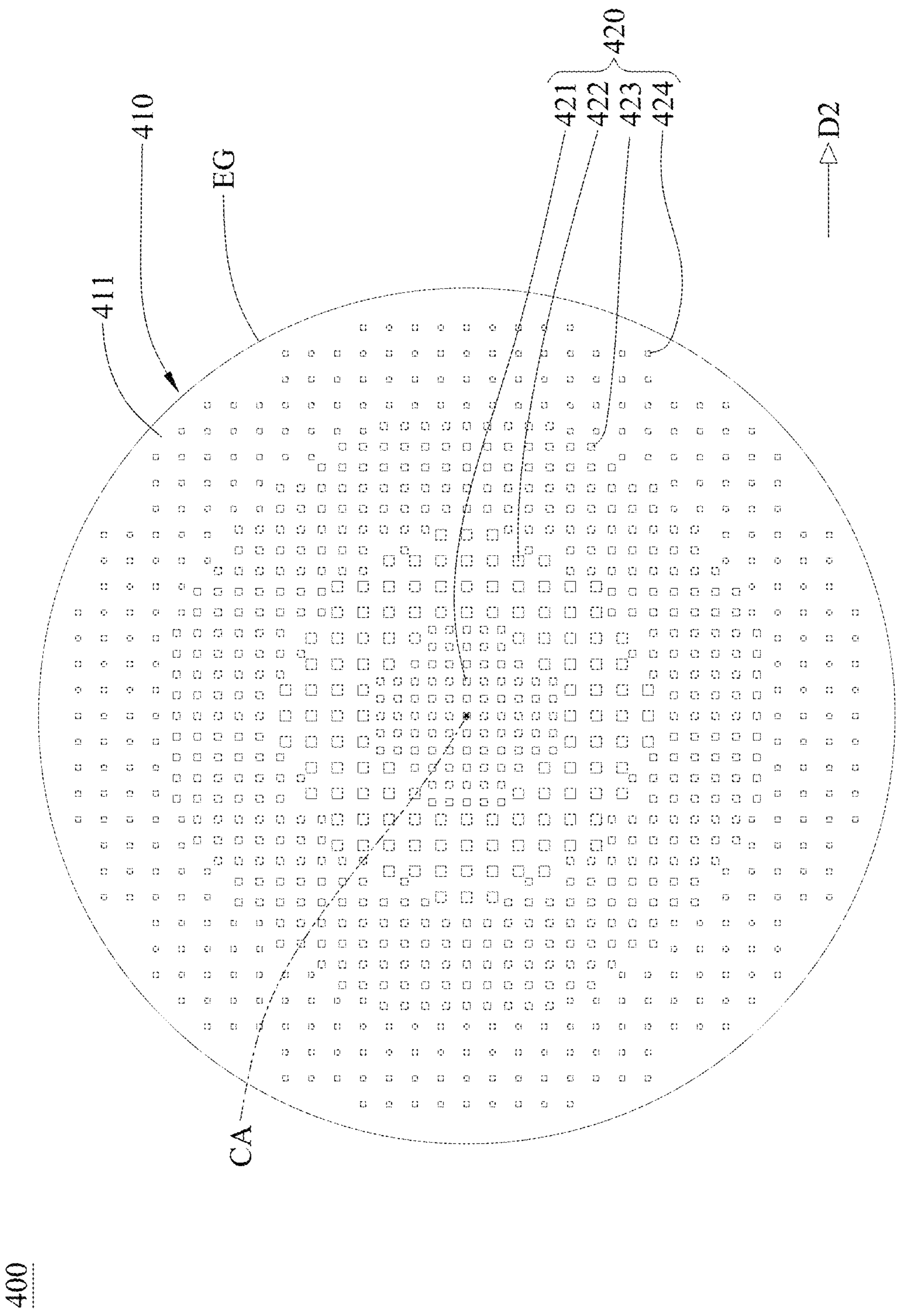
FIG. 11 is a top view of a central portion of an electromagnetic wave guidance and beam reshaping structure according to yet another embodiment of the present disclosure.
Figure 12:
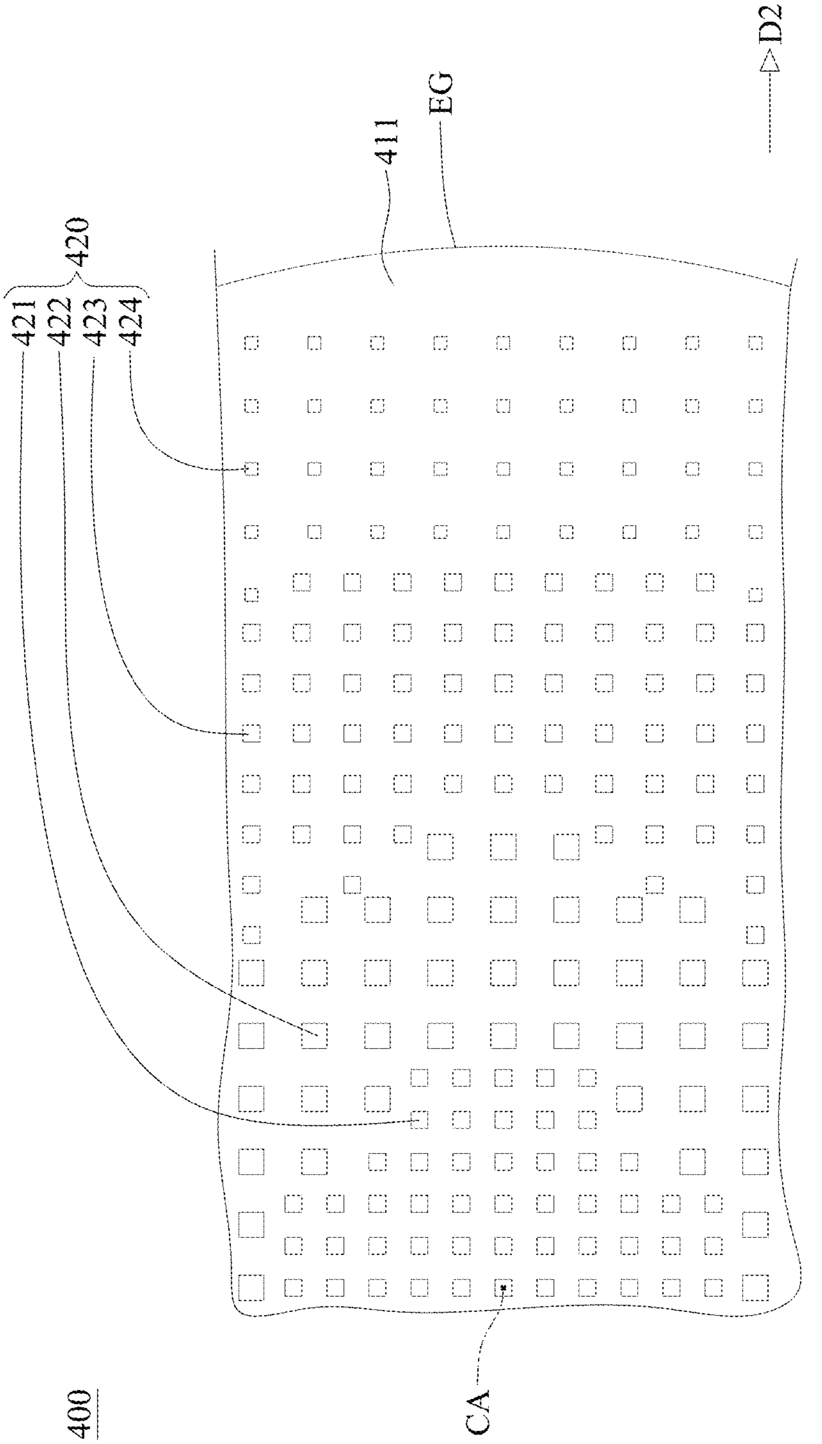
FIG. 12 is a partial and enlarged view of the central portion in FIG. 11.

In the above-mentioned embodiments, the first metal patterns 121 to 321 to the fourth metal patterns 124 to 324 are different in shape, but the present disclosure is not limited thereto. Please refer to FIG. 11 and FIG. 12, where FIG. 11 is a top view of a central portion 411 of an electromagnetic wave guidance and beam reshaping structure 400 according to yet another embodiment of the present disclosure, and FIG. 12 is a partial and enlarged view of the central portion 411 in FIG. 11. The electromagnetic wave guidance and beam reshaping structure 400 provided in this embodiment is similar to the electromagnetic wave guidance and beam reshaping structure 100 in the above-mentioned embodiment, and only the difference between the electromagnetic wave guidance and beam reshaping structure 400 and the electromagnetic wave guidance and beam reshaping structure 100, as well as necessary element, will be illustrated hereinafter.

Among the electromagnetic wave guidance and beam reshaping structure 400, the central portion 411 is circular, and the first metal patterns 421 to the fourth metal patterns 424 are rectangular; every single second metal pattern 422 has the largest surface area, each of every single first metal pattern 421 and every single third metal pattern 423 has the second largest surface area, and every single fourth metal pattern 424 has the smallest surface area; also, each adjacent two second metal patterns 422 and each adjacent two fourth metal patterns 424 have the longest distance therebetween (interval), each adjacent two third metal patterns 423 has the second longest distance therebetween (interval), and each adjacent two first metal patterns 421 has the shortest longest distance therebetween (interval). Accordingly, the first metal patterns 421 have the highest surface area proportion on the unit surface area of the substrate 410, the third metal patterns 423 have the second highest surface area proportion on the unit surface area of the substrate 410, the second metal patterns 422 and the fourth metal patterns 424 have the lowest surface area proportion on the unit surface area of the substrate 410, such that surface area proportions of the metal patterns 420 on each unit surface area of the substrate 410 in the second direction D2 from the central axis CA at the innermost of the substrate 410 to the edge EG at the outermost of the substrate 410 are gradually reduced, then gradually increased, and then gradually reduced again. Therefore, the equivalent dielectric constants of the electromagnetic wave guidance and beam reshaping structure 400 at the central portion 411 along the direction from the central axis CA at the innermost of the substrate 410 to the edge EG at the outermost of the substrate 410 can be gradually reduced, then gradually increased, and then gradually reduced again so as to meet a particular requirement.

Figure 13:
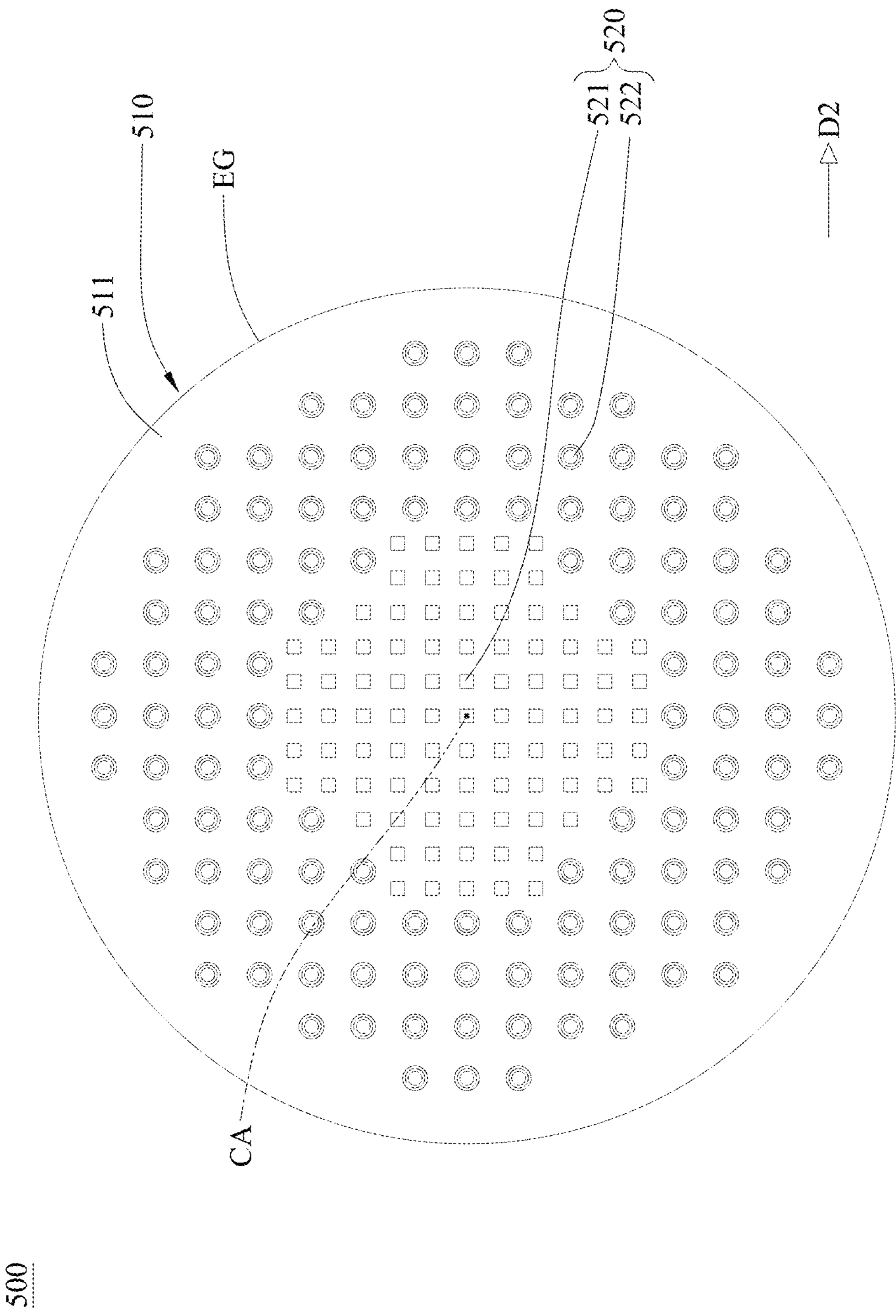
FIG. 13 is a top view of a central portion of an electromagnetic wave guidance and beam reshaping structure according to yet another embodiment of the present disclosure.
Figure 14:
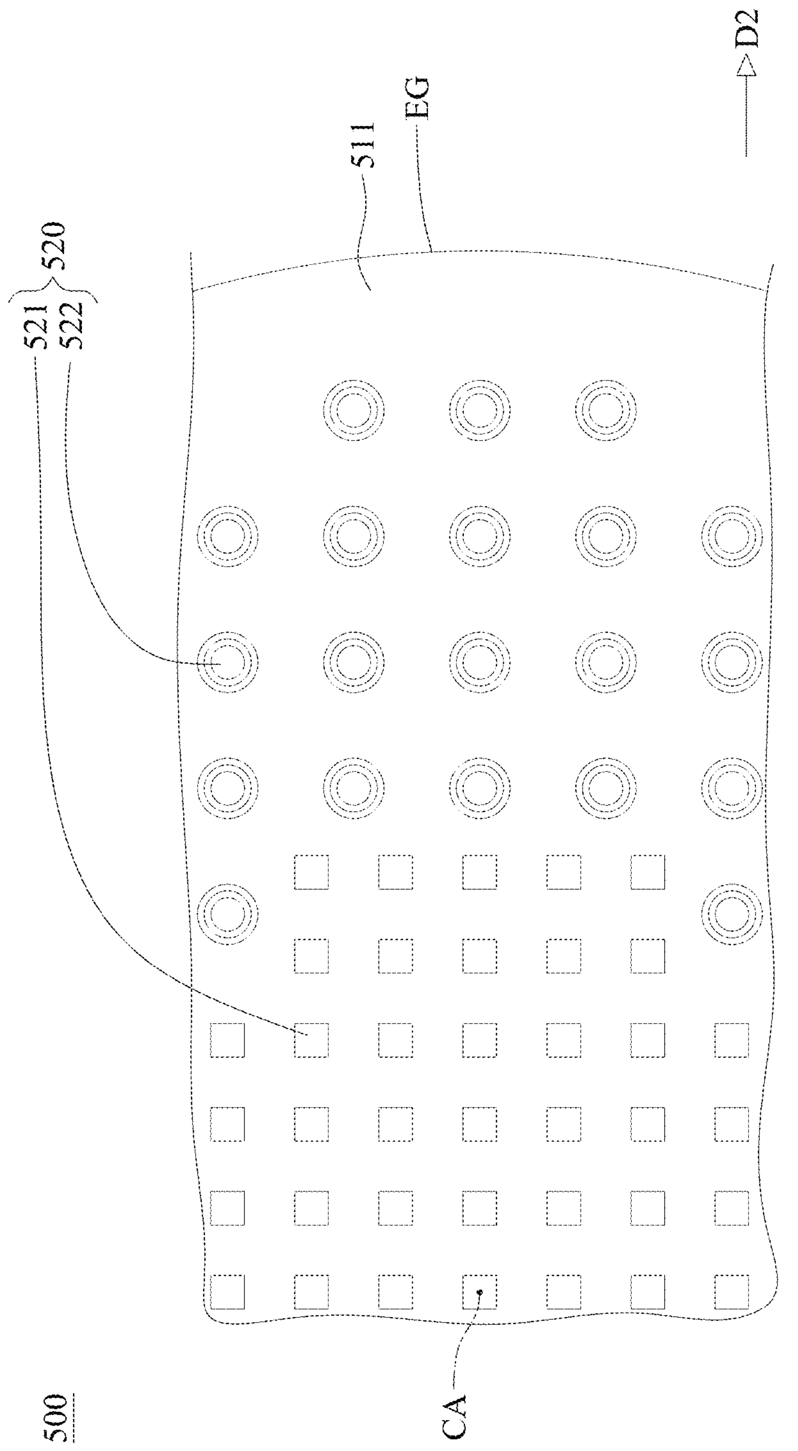
FIG. 14 is a partial and enlarged view of the central portion in FIG. 13.

In the above-mentioned embodiments, the metal patterns 120 to 420 all include four types of metal patterns, but the present disclosure is not limited thereto. Please refer to FIG. 13 and FIG. 14, where FIG. 13 is a top view of a central portion 511 of an electromagnetic wave guidance and beam reshaping structure 500 according to yet another embodiment of the present disclosure, and FIG. 14 is a partial and enlarged view of the central portion 511 in FIG. 13. The electromagnetic wave guidance and beam reshaping structure 500 provided in this embodiment is similar to the electromagnetic wave guidance and beam reshaping structure 100 in the above-mentioned embodiment, and only the difference between the electromagnetic wave guidance and beam reshaping structure 500 and the electromagnetic wave guidance and beam reshaping structure 100, as well as necessary elements, will be illustrated hereinafter.

In the electromagnetic wave guidance and beam reshaping structure 500, the central portion 511 is circular; the metal patterns 520 are distributed on the central portion 511 and are axisymmetrically arranged with respect to the central axis CA at the innermost of the substrate 510. The metal patterns 520 are substantially the same in thickness and include a plurality of first metal patterns 521 and a plurality of second metal patterns 522. The first metal patterns 521 are located closer to the central axis CA than the second metal patterns 522. Although the surface area of each first metal pattern 521 is slightly smaller than the surface area of each second metal pattern 522, the distance between each adjacent two first metal patterns 521 is smaller than the distance between each adjacent two second metal patterns 522, such that the surface area proportions of the metal patterns 520 on each unit surface area of the substrate 510 are still gradually reduced in the second direction D2 from the central axis CA at the innermost of the substrate 510 to the edge EG at the outermost of the substrate 510. Accordingly, the equivalent dielectric constants of the electromagnetic wave guidance and beam reshaping structure 500 at the central portion 511 along the direction from the central axis CA at the innermost of the substrate 510 to the edge EG at the outermost of the substrate 510 can be gradually reduced so as to meet a particular requirement.

Figure 15:
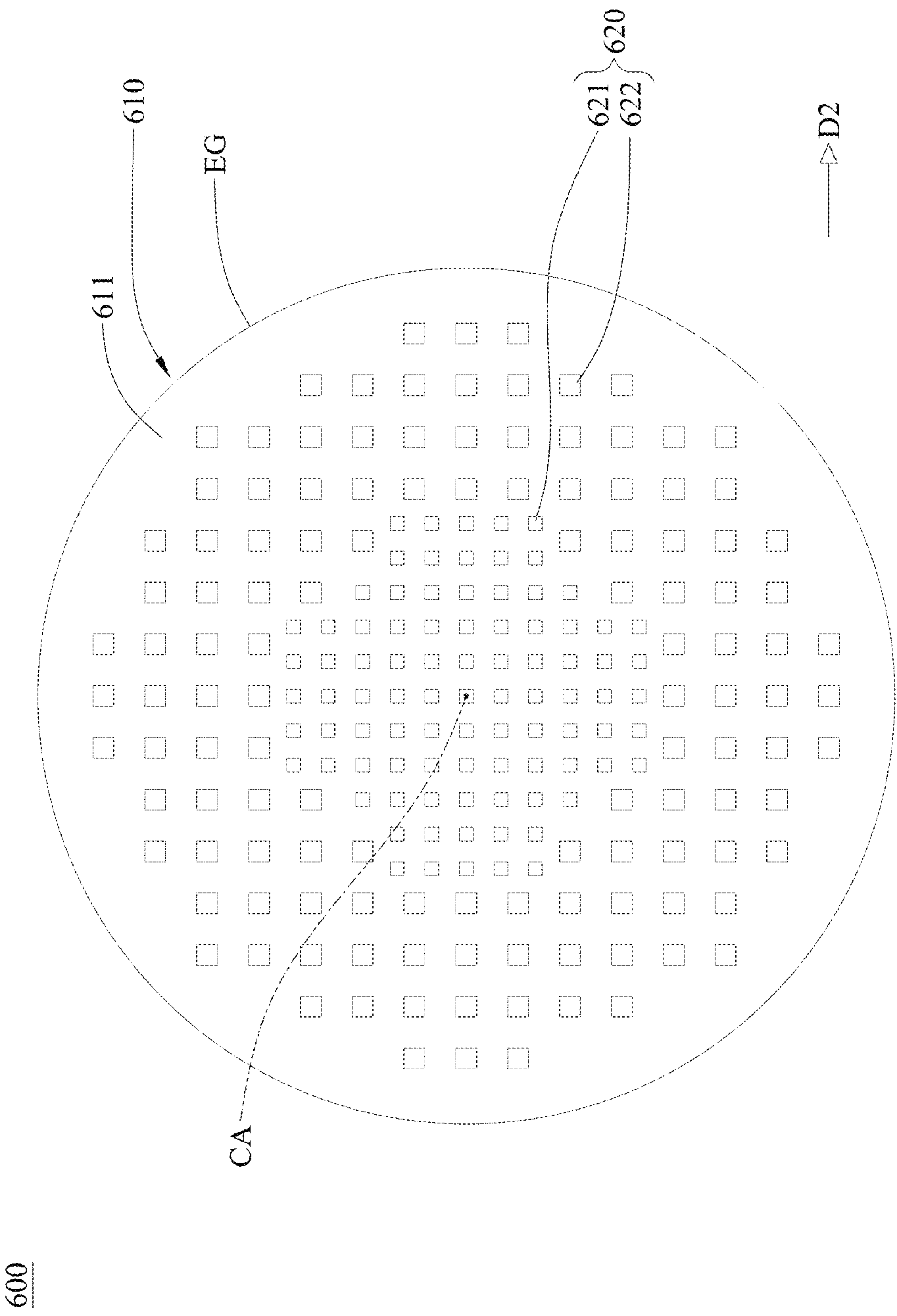
FIG. 15 is a top view of a central portion of an electromagnetic wave guidance and beam reshaping structure according to yet another embodiment of the present disclosure.
Figure 16:
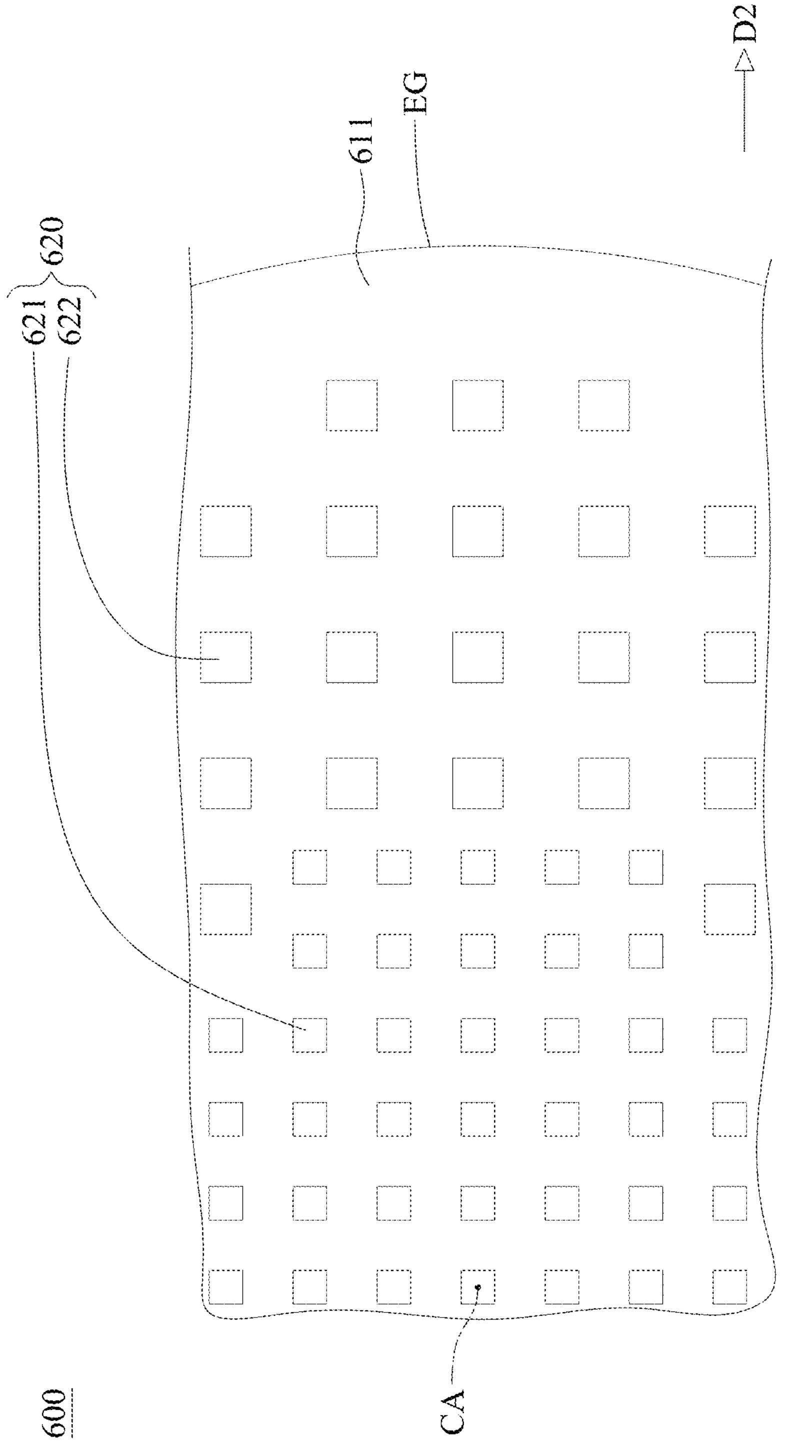
FIG. 16 is a partial and enlarged view of the central portion in FIG. 15.

In the above-mentioned embodiment, the first metal patterns 521 and the second metal patterns 522 are different in shape, but the present disclosure is not limited thereto. Please refer to FIG. 15 and FIG. 16, where FIG. 15 is a top view of a central portion 611 of an electromagnetic wave guidance and beam reshaping structure 600 according to yet another embodiment of the present disclosure, and FIG. 16 is a partial and enlarged view of the central portion 611 in FIG. 15. The electromagnetic wave guidance and beam reshaping structure 600 provided in this embodiment is similar to the electromagnetic wave guidance and beam reshaping structure 100 in the above-mentioned embodiment, and only the difference between the electromagnetic wave guidance and beam reshaping structure 600 and the electromagnetic wave guidance and beam reshaping structure 100, as well as necessary elements, will be illustrated hereinafter.

Among the electromagnetic wave guidance and beam reshaping structure 600, the central portion 611 is circular; the metal patterns 620 are distributed on the central portion 611 and are axisymmetrically arranged with respect to the central axis CA at the innermost of the substrate 610. The metal patterns 620 are substantially the same in thickness and include a plurality of first metal patterns 621 and a plurality of second metal patterns 622. The first metal patterns 621 are located closer to the central axis CA than the second metal patterns 622. The first metal patterns 621 and the second metal patterns 622 are rectangular. Although the surface area of each first metal pattern 621 is smaller than the surface area of each second metal pattern 622, the distance between each adjacent two first metal patterns 621 is smaller than the distance between each adjacent two second metal patterns 622, such that the surface area proportions of the metal patterns 620 on each unit surface area of the substrate 610 are still gradually reduced in the second direction D2 from the central axis CA at the innermost of the substrate 610 to the edge EG at the outermost of the substrate 610. Accordingly, the equivalent dielectric constants of the electromagnetic wave guidance and beam reshaping structure 600 at the central portion 611 along the direction from the central axis CA at the innermost of the substrate 610 to the edge EG at the outermost of the substrate 610 can be gradually reduced so as to meet a particular requirement.

According to the present disclosure, the above-mentioned features of the metal patterns, such as the intervals, the shapes, and the surface areas, can be utilized in numerous combinations so as to achieve specific results. Moreover, among the above-mentioned metal patterns, the metal patterns equidistant from the central axis may be different from each other in the interval, shape or surface area. Also, for ease of viewing, the metal patterns 120 to 620 protruded on the central portions 111 to 611 may not match the real scale in the drawings. In some other embodiments, the metal patterns may be sheets attached on the central portion or may be embedded in the central portion.

Figure 17:
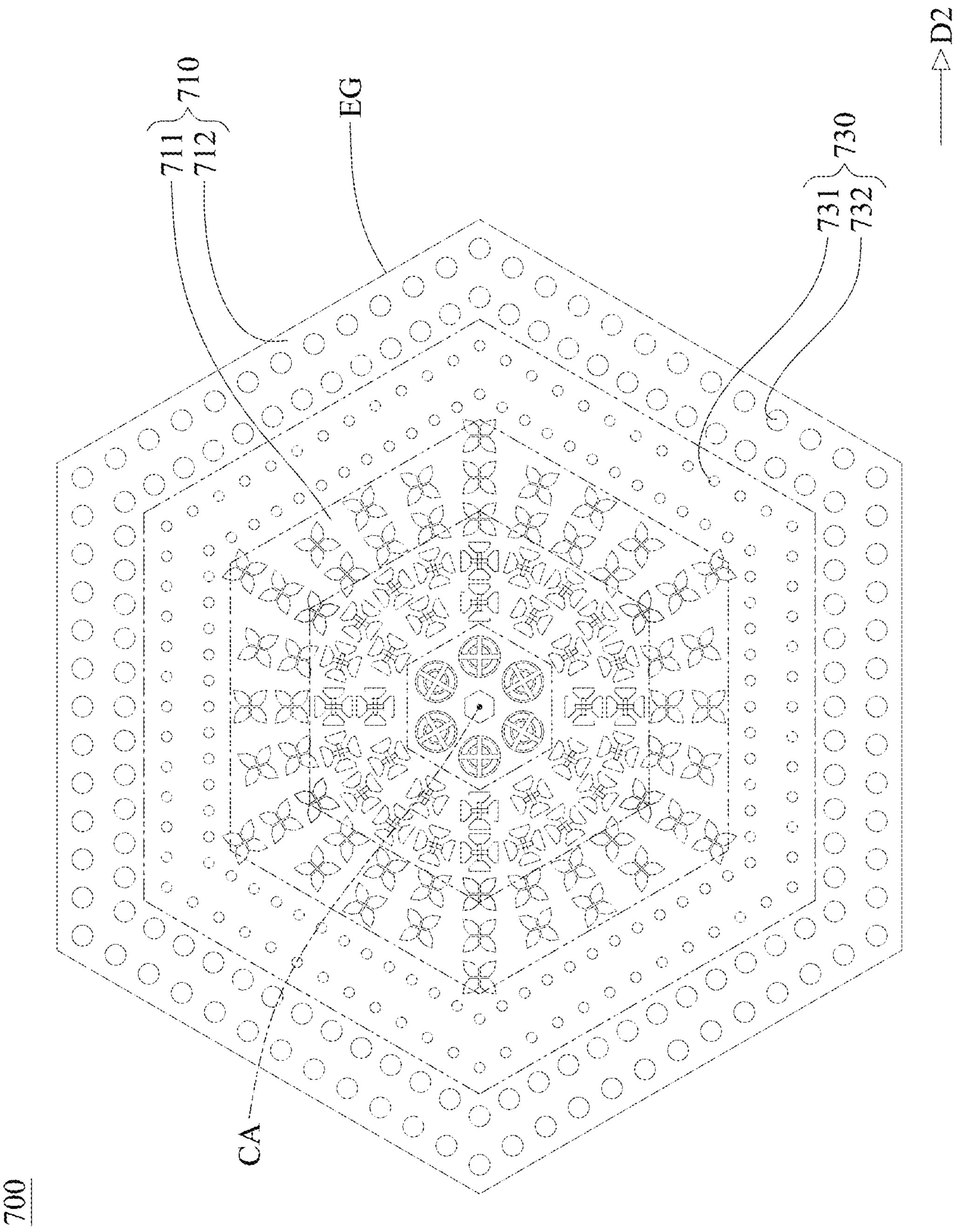
FIG. 17 is a top view of an electromagnetic wave guidance and beam reshaping structure according to yet another embodiment of the present disclosure.
Figure 18:
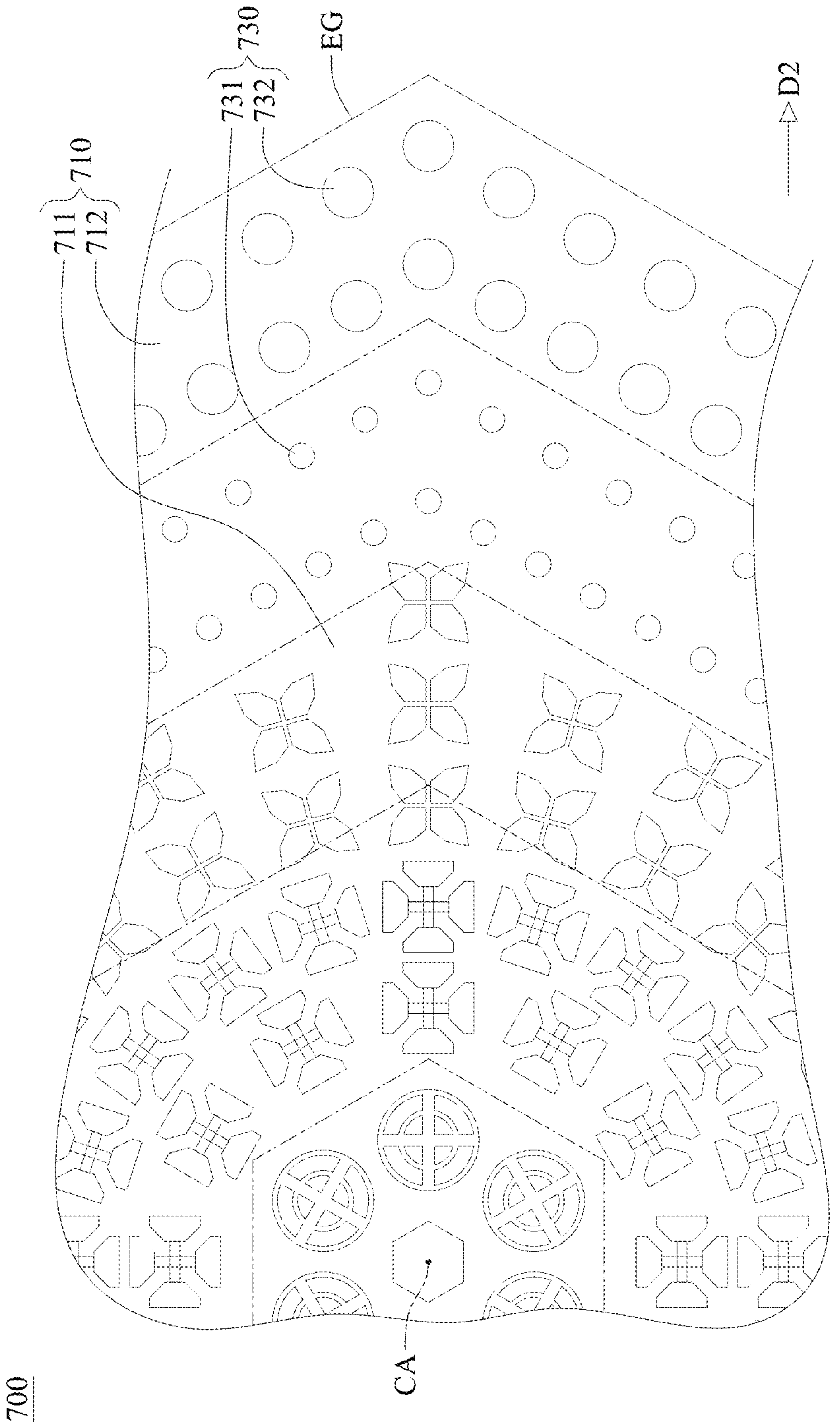
FIG. 18 is a partial and enlarged view of the electromagnetic wave guidance and beam reshaping structure in FIG. 17.

In the above-mentioned embodiments, the hollow structures 130 each have the same cross-sectional area, but the present disclosure is not limited thereto. Please refer to FIG. 17 and FIG. 18, where FIG. 17 is a top view of an electromagnetic wave guidance and beam reshaping structure 700 according to yet another embodiment of the present disclosure, and FIG. 18 is a partial and enlarged view of the electromagnetic wave guidance and beam reshaping structure 700 in FIG. 17. The electromagnetic wave guidance and beam reshaping structure 700 provided in this embodiment is similar to the electromagnetic wave guidance and beam reshaping structure 100 in the above-mentioned embodiment, and only the difference between the electromagnetic wave guidance and beam reshaping structure 700 and the electromagnetic wave guidance and beam reshaping structure 100, as well as necessary elements, will be illustrated hereinafter.

The hollow structures 730 are equidistantly distributed on the peripheral portion 712. The hollow structures 730 include a plurality of first hollow structures 731 and a plurality of second hollow structures 732. The first hollow structures 731 are located closer to the central portion 711 than the second hollow structures 732. The cross-sectional area of each single first hollow structure 731 is smaller than the cross-sectional area of each single second hollow structure 732, such that the volume proportions of the hollow structures 730 in each unit volume of the substrate 710 are gradually increased in the second direction D2 from the central axis CA at the innermost of the substrate 710 to the edge EG at the outermost of the substrate 710. Accordingly, the equivalent dielectric constant distribution of the electromagnetic wave guidance and beam reshaping structure 700 at the peripheral portion 712 in the second direction D2 from the central axis CA at the innermost of the substrate 710 to the edge EG at the outermost of the substrate 710 can be gradually reduced so as to meet a particular requirement.

According to the present disclosure, the above-mentioned features of the hollow structures, such as the intervals and the cross-sectional areas, can be utilized in numerous combinations so as to achieve specific results. Moreover, among the above-mentioned hollow structures, the hollow structures equidistant from the central axis may be different from each other in the interval or cross-sectional area. Furthermore, any arrangement of the metal patterns and any arrangement of the hollow structures as effective to generate variations in equivalent dielectric constant distribution as the electromagnetic wave guidance and beam reshaping structure can be combined to achieve the results of the present disclosure and should fall within the scope of the present disclosure, Please be noted that the central portion and the peripheral portion of the present disclosure are virtual regions and are only used for distinguishing the central positions of the metal patterns and the hollow structures. The metal patterns or the hollow structures are not strictly required to be located within their respective region. Therefore, several metal patterns in FIG. 1 to FIG. 3 and FIG. 17 to FIG. 18 partially exceed the boundary of the peripheral portion. Moreover, dash-double-dotted lines are used in the drawings as the boundaries for distinguishing the virtual regions, and the lines do not actually exist.

According to the electromagnetic wave guidance and beam reshaping structure discussed above, by arranging the metal patterns and the hollow structures on the substrate, the electromagnetic wave guidance and beam reshaping structure can have respective equivalent dielectric constant distributions at the central portion and the peripheral portion. This is favorable for adjusting the reflectivity of the electromagnetic waves so that the electromagnetic waves will have a focusing effect. Moreover, the electromagnetic wave guidance and beam reshaping structure may be a flat structure and therefore is capable of integration into various products. To be added, the electromagnetic wave guidance and beam reshaping structure is relatively easy to be manufactured. Furthermore, the design of the equivalent dielectric constant distribution of the electromagnetic wave guidance and beam reshaping structure is flexible since the configurations of the metal patterns and the hollow structures is easily modified as required. This allows the electromagnetic wave guidance and beam reshaping structure to be applicable to various frequency ranges.

The embodiments are chosen and described in order to best explain the principles of the present disclosure and its practical applications, to thereby enable others skilled in the art to best utilize the present disclosure and various embodiments with modifications and improvements which are suited to particular uses being contemplated. It is intended that the scope of the present disclosure is defined by the following claims and their equivalents.

What is claimed is:

1. An electromagnetic wave guidance and beam reshaping structure, configured to be disposed on an antenna, the electromagnetic wave guidance and beam reshaping structure comprising:

- a substrate, comprising:
  - a central portion; and
  - a peripheral portion, surrounding the central portion;
- a plurality of metal patterns, disposed on the central portion; and
- a plurality of hollow structures, disposed in the peripheral portion;
- wherein the plurality of metal patterns are axisymmetrically arranged with respect to a central axis of the substrate, and the plurality of hollow structures are axisymmetrically arranged with respect to the central axis of the substrate;
- wherein
- surface area proportions of the plurality of metal patterns on each unit surface area of the substrate along a direction from an inner side of the substrate to an outer side of the substrate are different, or
- volume proportions of the plurality of hollow structures in each unit volume of the substrate along the direction from the inner side of the substrate to the outer side of the substrate are different.

2. The electromagnetic wave guidance and beam reshaping structure according to claim 1, wherein the surface area proportions of the plurality of metal patterns on each unit surface area of the substrate along the direction from the inner side of the substrate to the outer side of the substrate are different, the plurality of metal patterns comprise a plurality of first metal patterns and a plurality of second metal patterns, the plurality of first metal patterns are located farther away from the peripheral portion than the plurality of second metal patterns, and a surface area of each of the plurality of first metal patterns is greater than a surface area of each of the plurality of second metal patterns.

3. The electromagnetic wave guidance and beam reshaping structure according to claim 1, wherein the surface area proportions of the plurality of metal patterns on each unit surface area of the substrate along the direction from the inner side of the substrate to the outer side of the substrate are different, the plurality of metal patterns comprise a plurality of first metal patterns, a plurality of second metal patterns, a plurality of third metal patterns and a plurality of fourth metal patterns; the plurality of first metal patterns to the plurality of fourth metal patterns are sequentially arranged along the direction from the inner side of the substrate to the outer side of the substrate, and a surface area of each of the plurality of first metal patterns, a surface area of each of the plurality of second metal patterns, a surface area of each of the plurality of third metal patterns and a surface area of each of the plurality of fourth metal patterns are different from one another.

4. The electromagnetic wave guidance and beam reshaping structure according to claim 1, wherein the surface area proportions of the plurality of metal patterns on each unit surface area of the substrate along the direction from the inner side of the substrate to the outer side of the substrate are different, a shape of each of the plurality of metal patterns is a same; the plurality of metal patterns comprise a plurality of first metal patterns and a plurality of second metal patterns; the plurality of first metal patterns are located farther away from the peripheral portion than the second metal patterns, and a distance between each adjacent two of the plurality of first metal patterns is less than a distance between each adjacent two of the plurality of second metal patterns.

5. The electromagnetic wave guidance and beam reshaping structure according to claim 1, wherein the surface area proportions of the plurality of metal patterns on each unit surface area of the substrate along the direction from the inner side of the substrate to the outer side of the substrate are different, a shape of each of the plurality of metal patterns is a same; the plurality of metal patterns comprise a plurality of first metal patterns, a plurality of second metal patterns, a plurality of third metal patterns and a plurality of fourth metal patterns; the plurality of first metal patterns to the plurality of fourth metal patterns are sequentially arranged along the direction from the inner side of the substrate to the outer side of the substrate, and a distance between each adjacent two of the plurality of first metal patterns, a distance between each adjacent two of the plurality of second metal patterns, a distance between each adjacent two of the plurality of third metal patterns and a distance between each adjacent two of the plurality of fourth metal patterns are different.

6. The electromagnetic wave guidance and beam reshaping structure according to claim 1, wherein the plurality of metal patterns comprises a plurality of first metal patterns and a plurality of second metal patterns, and the plurality of first metal patterns are located farther away from the peripheral portion than the plurality of second metal patterns; and wherein

- a surface area of each of the plurality of first metal patterns is different from a surface area of each of the plurality of second metal patterns,
- a shape of each of the plurality of first metal patterns is different from a shape of each of the plurality of second metal patterns, or
- a distance between each adjacent two of the plurality of first metal patterns is different from a distance between each adjacent two of the plurality of second metal patterns.

7. The electromagnetic wave guidance and beam reshaping structure according to claim 1, wherein the plurality of metal patterns comprise a plurality of first metal patterns and a plurality of second metal patterns, and the plurality of first metal patterns are located farther away from the peripheral portion than the plurality of second metal patterns; and wherein a surface area of each of the plurality of first metal patterns is a same as a surface area of each of the plurality of second metal patterns, a shape of each of the plurality of first metal patterns is a same as a shape of each of the plurality of second metal patterns, or a distance between each adjacent two of the plurality of first metal patterns is a same as a distance between each adjacent two of the plurality of second metal patterns.

8. The electromagnetic wave guidance and beam reshaping structure according to claim 1, wherein the plurality of metal patterns comprise a plurality of first metal patterns and a plurality of second metal patterns, and the plurality of first metal patterns are located farther away from the peripheral portion than the plurality of second metal patterns; and wherein a distance between each adjacent two of the plurality of first metal patterns, a shape of each of the plurality of first metal patterns, or a surface area of each of the plurality of first metal patterns is different, or a distance between each adjacent two of the plurality of second metal patterns, a shape of each of the plurality of second metal patterns, or a surface area of each of the plurality of second metal patterns is different.

9. The electromagnetic wave guidance and beam reshaping structure according to claim 1, wherein the plurality of metal patterns comprise a plurality of first metal patterns and a plurality of second metal patterns, and the plurality of first metal patterns are located farther away from the peripheral portion than the plurality of second metal patterns;

wherein a distance between each adjacent two of the plurality of first metal patterns is a same, a shape of each of the plurality of first metal patterns is a same, and a surface area of each of the plurality of first metal patterns is a same, or a distance between each adjacent two of the plurality of second metal patterns is a same, a shape of each of the plurality of second metal patterns is a same, and a surface area of each of the plurality of second metal patterns is a same.

10. The electromagnetic wave guidance and beam reshaping structure according to claim 1, wherein the volume proportions of the plurality of hollow structures in each unit volume of the substrate along the direction from the inner side of the substrate to the outer side of the substrate are different, the plurality of hollow structures are equidistantly distributed on the peripheral portion, the plurality of hollow structures comprise a plurality of first hollow structures and a plurality of second hollow structures, the plurality of first hollow structures are located closer to the central portion than the plurality of second hollow structures, and a cross-sectional area of each of the plurality of first hollow structure is less than a cross-sectional area of each of the plurality of second hollow structures.

11. The electromagnetic wave guidance and beam reshaping structure according to claim 1, wherein the volume proportions of the plurality of hollow structures in each unit volume of the substrate along the direction from the inner side of the substrate to the outer side of the substrate are different, a cross-sectional area of each of the plurality of hollow structures is a same, the plurality of hollow structures comprise a plurality of first hollow structures and a plurality of second hollow structures, the plurality of first hollow structures are located closer to the central portion than the plurality of second hollow structures, and a distance between each adjacent two of the plurality of first hollow structures is greater than a distance between each adjacent two of the plurality of second hollow structures.

12. The electromagnetic wave guidance and beam reshaping structure according to claim 1, wherein the plurality of hollow structures comprise a plurality of first hollow structures and a plurality of second hollow structures, and the plurality of first hollow structures are located closer to the central portion than the plurality of second hollow structures;

wherein a cross-sectional area of each of the plurality of first hollow structure is different from a cross-sectional area of each of the plurality of second hollow structure, or a distance between each adjacent two of the plurality of first hollow structures is different from a distance between each adjacent two of the plurality of second hollow structures.

13. The electromagnetic wave guidance and beam reshaping structure according to claim 1, wherein the plurality of hollow structures comprise a plurality of first hollow structures and a plurality of second hollow structures, and the plurality of first hollow structures are located closer to the central portion than the plurality of second hollow structures;

wherein a cross-sectional area of each of the plurality of first hollow structures is a same as a cross-sectional area of each of the plurality of second hollow structures, or a distance between each adjacent two of the plurality of first hollow structures is a same as a distance between each adjacent two of the plurality of second hollow structures.

14. The electromagnetic wave guidance and beam reshaping structure according to claim 1, wherein the plurality of hollow structures comprise a plurality of first hollow structures and a plurality of second hollow structures, and the plurality of first hollow structures are located closer to the central portion than the plurality of second hollow structures;

wherein a distance between each adjacent two of the plurality of first hollow structures or a cross-sectional area of each of the plurality of first hollow structures is different, or a distance between each adjacent two of the plurality of second hollow structures or a cross-sectional area of each of the plurality of second hollow structures is different.

15. The electromagnetic wave guidance and beam reshaping structure according to claim 1, wherein the plurality of hollow structures comprise a plurality of first hollow structures and a plurality of second hollow structures, and the plurality of first hollow structures are located closer to the central portion than the plurality of second hollow structures;

wherein a distance between each adjacent two of the plurality of first hollow structures is a same, and a cross-sectional area of each of the plurality of first hollow structures is a same, or a distance between each adjacent two of the plurality of second hollow structures is a same, and a cross-sectional area of each of the plurality of second hollow structures is a same.

16. The electromagnetic wave guidance and beam reshaping structure according to claim 1, wherein the plurality of hollow structures are through holes.

17. The electromagnetic wave guidance and beam reshaping structure according to claim 1, wherein the plurality of hollow structures are blind holes.

18. An electromagnetic wave guidance and beam reshaping structure, configured to be disposed on an antenna, the electromagnetic wave guidance and beam reshaping structure comprising:

a plurality of substrates stacked with each other, each of the plurality of substrates comprising:

a central portion; and a peripheral portion, surrounding the central portion;

a plurality of metal patterns, disposed on the central portion of at least one of the plurality of substrates; and a plurality of hollow structures, disposed in the peripheral portion of at least one of the plurality of substrates;

wherein the plurality of metal patterns are axisymmetrically arranged with respect to a central axis of the at least one of the plurality of substrates, and the plurality of hollow structures are axisymmetrically arranged with respect to the central axis of the at least one of the plurality of substrates;

wherein surface area proportions of the plurality of metal patterns on each unit surface area of the at least one of the plurality of substrates along a direction from an inner side of the at least one of the plurality of substrates to an outer side of the at least one of the plurality of substrates are different, or volume proportions of the plurality of hollow structures in each unit volume of the at least one of the plurality of substrates along the direction from the inner side of the at least one of the plurality of substrates to the outer side of the at least one of the plurality of substrates are different.

* * * * *